United States Patent
Nishio et al.

(10) Patent No.: US 10,122,491 B2
(45) Date of Patent: *Nov. 6, 2018

(54) BASE STATION APPARATUS AND RADIO COMMUNICATION METHOD FOR RECEIVING INFORMATION INDICATIVE OF CHANNEL QUALITY FROM MOBILE STATION

(71) Applicant: Optis Wireless Technology, LLC, Plano, TX (US)

(72) Inventors: Akihiko Nishio, Osaka (JP); Jun Cheng, Kyoto (JP)

(73) Assignee: Optis Wireless Technology, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/613,794

(22) Filed: Jun. 5, 2017

(65) Prior Publication Data

US 2017/0272204 A1 Sep. 21, 2017

Related U.S. Application Data

(63) Continuation of application No. 15/156,229, filed on May 16, 2016, now Pat. No. 9,705,636, which is a
(Continued)

(30) Foreign Application Priority Data

Aug. 6, 2003 (JP) .................................. 2003-288162

(51) Int. Cl.
*H04L 1/00* (2006.01)
*H04L 5/00* (2006.01)
(Continued)

(52) U.S. Cl.
CPC ............ *H04L 1/0026* (2013.01); *H04L 5/003* (2013.01); *H04L 5/006* (2013.01); *H04L 5/0044* (2013.01);
(Continued)

(58) Field of Classification Search
CPC ..... H04L 1/0026; H04L 5/0053; H04L 5/006; H04L 5/0046; H04L 5/0044; H04L 5/003;
(Continued)

(56) References Cited

U.S. PATENT DOCUMENTS 5,479,447 A 12/1995 Chow et al.
5,513,174 A 4/1996 Punj
(Continued)

FOREIGN PATENT DOCUMENTS

DE 198 00 953 C1 7/1999
JP 10-503356 A 3/1998
(Continued)

OTHER PUBLICATIONS

Hara et al., "MC-CDM System for Packet Communications Using Frequency Scheduling," Technical Report of IEICE, NS2002-101 RCS2002-129, The Institute of Electronics, Information and Communication Engineers, pp. 61-66, Jul. 2002. (with English Abstract).
(Continued)

*Primary Examiner* — Andrew Lai
*Assistant Examiner* — Chuong M Nguyen
(74) *Attorney, Agent, or Firm* — Nixon & Vanderhye PC

(57) ABSTRACT

A wireless communication method and apparatus are provided for selecting quality-reporting sub-carrier bands based on sub-carrier band quantity information received from a base station. The method includes generally four steps. First, from a base station, information indicating quantity of sub-carrier bands is acquired. Second, channel quality of each of a plurality of sub-carrier bands within a communi-
(Continued)

US 10,122,491 B2
Page 2 cation band is measured from a received signal. Third, sub-carrier bands are selected from the plurality of sub-carrier bands, wherein quantity of the selected sub-carrier bands corresponds to the quantity of sub-carrier bands indicated by the acquired information. Fourth, information indicating channel quality of the selected sub-carrier bands is reported to the base station.

24 Claims, 15 Drawing Sheets

Related U.S. Application Data continuation of application No. 13/961,658, filed on Aug. 7, 2013, now Pat. No. 9,363,699, which is a continuation of application No. 12/489,133, filed on Jun. 22, 2009, now Pat. No. 8,532,581, which is a continuation of application No. 10/566,732, filed as application No. PCT/JP2004/011499 on Aug. 4, 2004, now Pat. No. 8,934,848.

(51) Int. Cl.
  H04W 28/06     (2009.01)
  H04W 72/12     (2009.01)
  H04W 24/10     (2009.01)
  H04L 1/16      (2006.01)

(52) U.S. Cl.
  CPC .......... H04L 5/0046 (2013.01); H04L 5/0053 (2013.01); H04W 24/10 (2013.01); H04W 28/06 (2013.01); H04W 72/1231 (2013.01); H04W 72/1284 (2013.01); H05K 999/99 (2013.01); H04L 1/1671 (2013.01); Y02D 70/00 (2018.01); Y02D 70/1244 (2018.01)

(58) Field of Classification Search
  CPC ............ H04L 1/1671; H04W 72/1284; H04W 72/1231; H04W 28/06; H04W 24/10; Y02B 60/50
  See application file for complete search history.

(56) References Cited

U.S. PATENT DOCUMENTS

| | | | |
|---|---|---|---|
| 5,638,369 A | 6/1997 | Ayerst et al. | |
| 5,726,978 A | 3/1998 | Frodigh et al. | |
| 5,909,436 A | 6/1999 | Engstrom | |
| 5,914,933 A | 6/1999 | Cimini et al. | |
| 5,960,354 A | 9/1999 | Einola | |
| 5,966,657 A | 10/1999 | Sporre | |
| 6,031,832 A | 2/2000 | Turina | |
| 6,397,077 B1 | 5/2002 | Jensen | |
| 6,904,283 B2* | 6/2005 | Li | H04L 1/0003 370/208 |
| 6,965,568 B1 | 11/2005 | Larsen | |
| 7,039,120 B1* | 5/2006 | Thoumy | H04L 5/0007 375/260 |
| 7,072,682 B2 | 7/2006 | Uehara et al. | |
| 7,272,162 B2 | 9/2007 | Sano et al. | |
| 7,430,257 B1* | 9/2008 | Shattil | H04B 1/707 342/367 |
| 8,532,581 B2 | 9/2013 | Nishio | |
| 8,934,848 B2 | 1/2015 | Nishio | |
| 9,363,699 B2* | 6/2016 | Nishio | H04L 1/0026 |
| 9,705,636 B2* | 7/2017 | Nishio | H04L 1/0026 |
| 2002/0119781 A1 | 8/2002 | Li et al. | |
| 2002/0181421 A1 | 12/2002 | Sano et al. | |
| 2002/0188723 A1* | 12/2002 | Choi | H04W 36/06 709/225 |
| 2003/0054847 A1 | 3/2003 | Kim et al. | |
| 2003/0072395 A1 | 4/2003 | Jia et al. | |
| 2003/0169681 A1 | 9/2003 | Li et al. | |
| 2004/0202103 A1 | 10/2004 | Suh et al. | |
| 2005/0025039 A1 | 2/2005 | Hwang et al. | |
| 2005/0232135 A1 | 10/2005 | Mukai et al. | |
| 2005/0286547 A1 | 12/2005 | Baum et al. | |
| 2005/0289256 A1 | 12/2005 | Cudak et al. | |
| 2006/0014542 A1 | 1/2006 | Khandekar et al. | |

FOREIGN PATENT DOCUMENTS

| | | |
|---|---|---|
| JP | 11-508417 A | 7/1999 |
| JP | 2002-135230 A | 5/2002 |
| JP | 2002-199459 A | 7/2002 |
| JP | 2002-252619 A | 9/2002 |
| JP | 2003-169036 A | 6/2003 |
| KR | 10-2003-0019210 A | 3/2003 |
| RU | 2 100 904 C1 | 12/1997 |
| RU | 2 134 489 C1 | 8/1999 |
| RU | 2 157 591 C2 | 10/2000 |
| RU | 2 193 818 C1 | 11/2002 |
| RU | 2 198 475 C2 | 2/2003 |
| WO | WO 97/01256 A1 | 1/1997 |
| WO | 98/10542 A2 | 3/1998 |
| WO | 98/24258 A2 | 6/1998 |
| WO | 02/09334 A1 | 1/2002 |
| WO | 02/49305 A2 | 6/2002 |
| WO | 02/058300 A1 | 7/2002 |
| WO | 03/049353 A1 | 6/2003 |

OTHER PUBLICATIONS

International Search Report, dated Jan. 11, 2005, for International Application No. PCT/JP2004/011499, 4 pages.
Office Action, dated Jul. 6, 2012, for corresponding Chinese Application No. 200910166194.1, 8 pages.
Office Action, dated Nov. 15, 2011, for corresponding Japanese Application No. 2011-098142, 3 pages.
Office Action, dated Aug. 2, 2011, for corresponding Korean Application No. 10-2011-7011746, 3 pages.
Supplementary European Search Report, dated Sep. 28, 2011, for corresponding European Application No. 04771484.5-2411 / 1646163, 4 pages.
Notice of Allowance dated Mar. 9, 2017 in U.S. Appl. No. 15/158,229.
Office Action dated Oct. 13, 2016 in U.S. Appl. No. 15/158,229.
Notice of Allowance dated Nov. 7, 2014 in U.S. Appl. No. 10/566,732.
Notice of Allowance dated Mar. 10, 2014 in U.S. Appl. No. 10/566,732.
Office Action dated Oct. 3, 2013 in U.S. Appl. No. 10/566,732.
Advisory Action dated Nov. 15, 2011 in U.S. Appl. No. 10/566,732.
Final Office Action dated Aug. 2, 2011 in U.S. Appl. No. 10/566,732.
Office Action dated Dec. 21, 2010 in U.S. Appl. No. 10/566,732.
Advisory Action dated Jan. 12, 2010 in U.S. Appl. No. 10/566,732.
Final Office Action dated Sep. 29, 2009 in U.S. Appl. No. 10/566,732.
Office Action dated Mar. 17, 2009 in U.S. Appl. No. 10/566,732.
Notice of Allowance dated May 10, 2013 in U.S. Appl. No. 12/489,133.
Office Action dated Oct. 18, 2102 in U.S. Appl. No. 12/489,133.
Notice of Allowance dated Feb. 4, 2016 in U.S. Appl. No. 13/961,658.
Office Action dated Jul. 28, 2015 in U.S. Appl. No. 13/961,658.
EP Intention to Grant dated Jan. 8, 2018 in EP application 13156986.5.
EP Intention to Grant datedd Jan. 5, 2018 in EP application 13157023.6.
Russian Decision on Grant and English translation dated Oct. 2, 2017 in RU application 2013145071/08(069704).
BR Office Action dated Feb. 28, 2018 in BR application PI0413356-0.
European Search Report dated Sep. 7, 2018 in EP application 18179619.4.
BR Rejection Decision and English translation dated Aug. 31, 2018 in BR application PI0413356-0.

* cited by examiner

BASE STATION APPARATUS AND RADIO COMMUNICATION METHOD FOR RECEIVING INFORMATION INDICATIVE OF CHANNEL QUALITY FROM MOBILE STATION

CROSS-REFERENCE(S) TO RELATED APPLICATION(S)

This is a continuation of U.S. patent application Ser. No. 15/156,229 filed May 16, 2016 (pending), which is a continuation of U.S. patent application Ser. No. 13/961,658 filed Aug. 7, 2013 (U.S. Pat. No. 9,363,699), which is a continuation of U.S. patent application Ser. No. 12/489,133 filed Jun. 22, 2009 (U.S. Pat. No. 8,532,581), which is a continuation of U.S. patent application Ser. No. 10/566,732 filed Mar. 14, 2006 (U.S. Pat. No. 8,934,848), which is the national phase under 35 USC 371 of PCT/JP2004/011499 filed Aug. 4, 2004, which is based on Japanese application number 2003-288162 filed Aug. 6, 2003, the entire contents of each of which are incorporated by reference herein.

BACKGROUND

I. Technical Field

The present invention relates to a wireless communication and reception quality reporting method, and particularly relates to a wireless communication apparatus and reception quality reporting method for performing high-speed packet communication using adaptive modulation and scheduling.

II. Related Art and Other Considerations

In a conventional art, in HSDPA (High-Speed Downlink Packet Access) of 3GPP, adaptive modulation where the modulation scheme is adaptively controlled according to propagation path conditions and scheduling for transmitting a user signal for which propagation path conditions are comparatively superior have been employed in downlink high-speed packet transmission.

In multi-carrier transmission such as OFDM and MC-CDMA (for example, Hara, Kawabata, Duan and Sekiguchi, "MC-CDM System for Packet Communications Using Frequency Scheduling", TECHNICAL REPORT OF IEICE, RCS2002-129, July 2002, refer to pp. 61-66) being examined as transmission schemes for beyond 3G mobile communication systems, high speed transmission is implemented using a large number of sub-carriers.

In this kind of transmission scheme, performing adaptive modulation and scheduling every sub-carrier is examined.

With this kind of adaptive modulation and scheduling system, it is necessary for the mobile station to give reporting of channel quality information (CQI (Channel Quality Indicator)) of each sub-carrier instantaneously at a base station.

The mobile station reports individual CQIs on every sub-carrier for all sub-carriers to the base station.

A base station then determines the sub-carrier, modulation scheme and encoding rate to be used at each mobile station in accordance with a predetermined scheduling algorithm taking into consideration the CQIs from each mobile station.

Typically, sub-carriers with comparatively good propagation path conditions are allocated to each mobile station, and a modulation scheme and encoding rate satisfying a predetermined packet error rate are employed for these propagation conditions.

In the event that a base station transmits to a plurality of mobile stations at the same time, frequency scheduling is carried out using CQIs of all of the sub-carriers from all of the users.

In other words, if there are 64 sub-carriers, it is necessary for each mobile station to give reporting of 64 CQIs.

In this event, when a CQI is expressed using five bits, it is necessary to transmit a total of 64×5=3 20 bits per one user in each wireless frame.

However, with wireless communication apparatus of the conventional art, the quantity of signal required for CQI reporting is enormous. This means that interference incurred by other data channels and other cells is large, and the quantity of data that can be transmitted is therefore substantially reduced.

Further, as the quantity of signal for giving CQI reporting is enormous, power consumption of the mobile station is increased and a battery life is shortened.

BRIEF SUMMARY

According to an aspect of the present invention, a wireless communication apparatus and reception quality reporting method are provided, which are capable of increasing the data capacity that can be transmitted and reducing power consumption by reducing the amount of control signal transmitted, and increasing system capacity by reducing interference with respect to other wireless communication apparatuses.

According to an aspect of the present invention, a wireless communication apparatus is comprised of a measuring section that measures reception quality of a plurality of sub-carriers within a communication band from a received signal every sub-carrier, a selecting section that selects a sub-carrier satisfying a predetermined condition relating to measured reception quality from the plurality of sub-carriers, and a reporting section that gives a reporting of a selection result of the selecting section.

According to a further aspect of the present invention, a base station apparatus is comprised of a modulating section that modulates a packet data using an M-ary number adaptively selected based on a reporting of a selection result in which a sub-carrier satisfying a predetermined condition relating to reception quality at an opposing communication apparatus from a plurality of sub-carriers within a communication band, an encoding section that encodes the packet data using an encoding rate adaptively selected based on the reporting, and a scheduling section that identifies a sub-carrier satisfying the predetermined condition based on the reporting and carries out scheduling so that a packet data of a higher M-ary number or encoding rate to an identified sub-carrier having superior reception quality.

According to a further aspect of the present invention, a reception quality reporting method is comprised of a measuring step of measuring reception quality of a plurality of sub-carriers within a communication band from a received signal every sub-carrier, a selection step of selecting a sub-carrier satisfying a predetermined condition relating to measured reception quality from the plurality of sub-carriers, and a reporting step of giving a reporting of a selection result of the selecting section.

DETAILED DESCRIPTION

The following is a detailed description of embodiments of the present invention with reference to the accompanying drawings.

Embodiment 1

Figure 1:
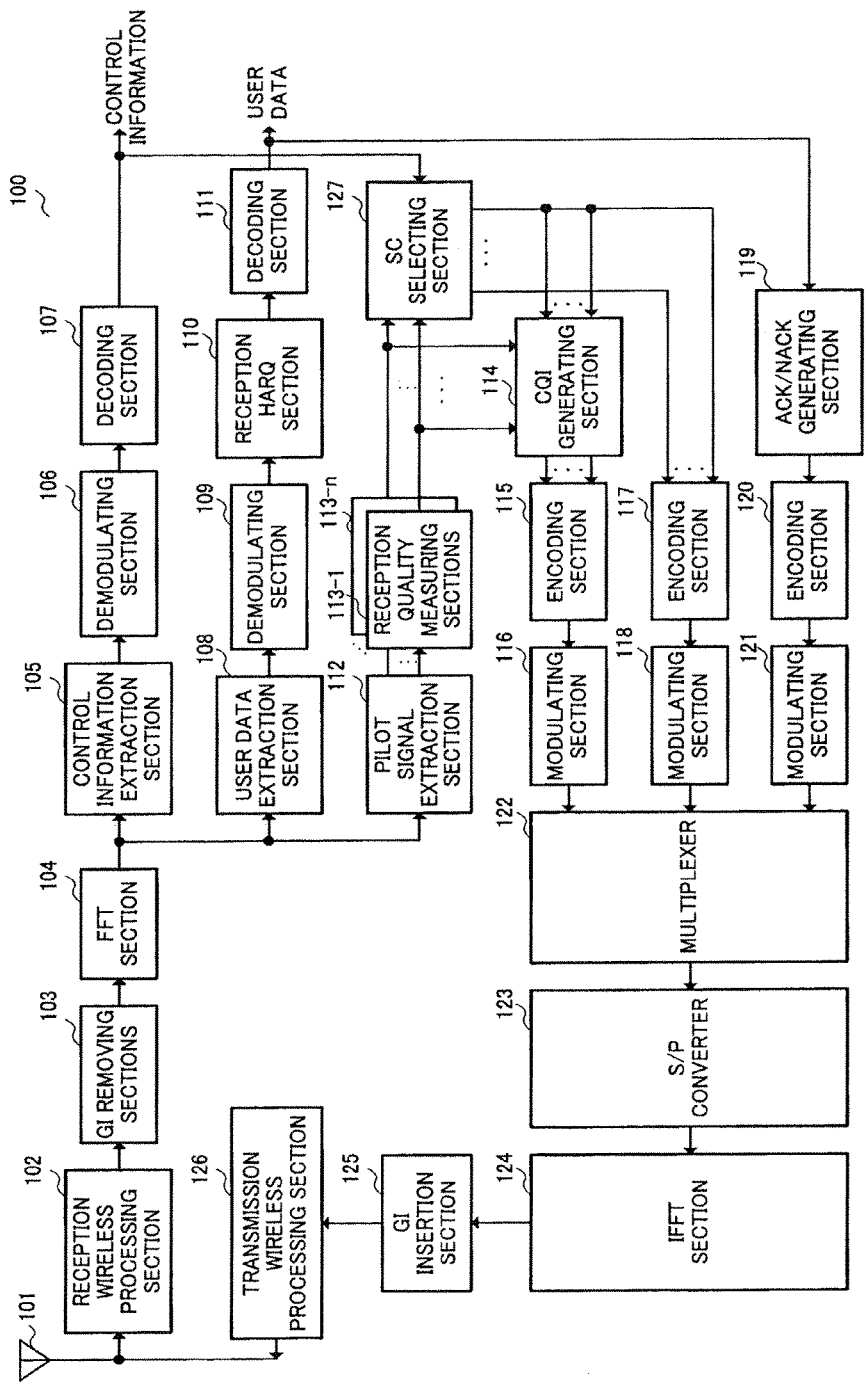
FIG. 1 is a is a block diagram showing a configuration of a wireless communication apparatus of Embodiment 1 of the present invention.

FIG. 1 is a block diagram showing a configuration of wireless communication apparatus 100 of Embodiment 1 of the present invention.

Reception wireless processing section 102 down converts and suchlike a received signal received at antenna 101 from a radio frequency to a baseband frequency and outputs to guard interval (hereinafter referred to as "GI") removing section 103.

GI removing section 103 removes GI's from a received signal inputted from reception wireless processing section 102 and then outputs to fast Fourier transform (hereinafter referred to as "FFT; Fast Fourier Transform") section 104.

After converting the received signal inputted from GI removing section 103 from a serial data format to a parallel data format, FFT section 104 subjects the received signal to FFT and outputs to control information extraction section 105, user data extraction section 108 and pilot signal extraction section 112.

Control information extraction section 105 extracts control information contained in CQI quantity information transmitted from the base station apparatus from the received signal inputted from FFT section 104 and outputs to demodulating section 106.

Demodulating section 106 subjects control information inputted by control information extraction section 105 to demodulation processing and outputs to a decoding section 107.

Decoding section 107 decodes demodulated control information inputted by demodulating section 106, outputs decoded control information, and outputs CQI quantity information contained in the control information to sub-carrier selecting section (hereinafter referred to as "SC selecting section") 127.

User data extraction section 108 extracts user data from the received signal inputted by FFT section 104 and outputs to demodulating section 109.

Demodulating section 109 subjects user data inputted by user data extraction section 108 to demodulation processing and outputs to reception HARQ (Hybrid Automation Repeat Request) section 110.

If user data inputted by demodulating section 109 is new data, reception HARQ section 110 saves all or part of the user data and outputs the user data to a decoding section 111.

If the user data inputted by demodulating section 109 is re-transmitted data, reception HARQ section 110 combines the saved user data with the re-transmitted data, saves the combined user data, and outputs the combined user data to decoding section 111.

Decoding section 111 decodes user data inputted by reception HARQ section 110 and outputs user data.

Further, decoding section 111 performs error detection and decoding, and outputs the result to ACK/NACK generating section 119.

The error detection may use CRC (Cyclic Redundancy Checks).

This error detection is not limited to CRC and arbitrary error detection methods may also be applied.

Pilot signal extraction section 112 extracts a pilot signal from the received signal inputted by FFT section 104 and outputs to reception quality measuring sections 113-1 to 113-n.

Reception quality measuring sections 113-1 to 113-n are provided for the useable number of sub-carriers. Reception quality measuring sections 113-1 to 113-n measure reception quality every sub-carrier for all of the sub-carriers using a pilot signal inputted from pilot signal extraction section 112. Measurement value information indicating reception quality every measured sub-carrier is outputted to CQI generation section 114 and SC selecting section 127.

Arbitrary measurement values such as CIR (Carrier to Interference Ratio), SIR (Signal to Interference Ratio) and suchlike measured every sub-carrier can be used for the measurement value information.

CQI generating section 114 constituting a reception quality information generating section compares measurement value information inputted by reception quality measuring section 113 with a plurality of threshold values (second threshold values) for CQI selection use set according to reception quality, for a sub-carriers of a sub-carrier number (hereinafter referred to as "SC number") information that is identification information inputted from SC selecting section 127, and selects and generates a CQI every sub-carrier.

In other words, CQI generating section 114 has a reference table that stores information for CQI selection use to which different CQIs are allocated every predetermined region for measurement values indicating reception quality separated by threshold values for use in selection of the plurality of CQIs, and selects CQIs by referring to information for CQI selection use employing measurement value information inputted by a reception quality measuring section 113.

CQI generating section 114 generates one CQI for one sub-carrier and therefore generates CQIs for the designated number of sub-carriers.

CQI generating section 114 outputs the generated CQIs to an encoding section 115.

Generation of a CQI is not limited to after selection of a sub-carrier and it is also possible to select a generated CQI based on CQI quantity information after generating CQIs for all of the sub-carriers.

Encoding section 115 encodes CQIs for the number of designated sub-carriers inputted by CQI generating section 114 and outputs to modulating section 116.

Modulating section 116 modulates CQIs inputted by encoding section 115 and outputs to multiplexer 122.

Encoding section 117 encodes SC number information inputted by SC selecting section 127 and outputs to modulating section 118.

Modulating section 118 modulates SC number information inputted by encoding section 117 and outputs to multiplexer 122.

ACK/NACK generating section 119, according to error detection result information inputted by decoding section 111, generates a NACK signal constituting an error determination signal if re-transmission is necessary, generates an ACK signal constituting an error determination signal in the event that re-transmission is not necessary, and outputs the generated NACK signal and ACK signal to an encoding section 120.

Encoding section 120 encodes a NACK signal or ACK signal inputted by ACK/NACK generating section 119 and outputs to modulating section 121.

Modulating section 121 modulates a NACK signal or ACK signal inputted by encoding section 120 and outputs to multiplexer 122.

Multiplexer 122 multiplexes CQIs inputted by modulating section 116, SC number information inputted by modulating section 118, and NACK signals or ACK signals inputted by modulating section 121 so as to generate transmission data and outputs the generated transmission data to a serial/parallel (hereinafter referred to as "S/P") converter 123.

S/P converter 123 converts transmission data inputted by multiplexer 122 from a serial data format to a parallel data format and outputs to inverse fast Fourier transform (hereinafter referred to as "IFFT: Inverse Fast Fourier Transform") section 124.

IFFT section 124 subjects transmission data inputted by S/P converter 123 to inverse fast Fourier transformation and outputs to GI insertion section 125.

GI insertion section 125 inserts GI's into transmission data inputted from IFFT section 124 and outputs to transmission wireless processing section 126.

Transmission wireless processing section 126 upconverts transmission data inputted from GI insertion section 125 from a baseband frequency to a radio frequency and transmits from antenna 101.

SC selecting section 127 constituting a selecting section selects a number of sub-carriers designated by the CQI quantity information in descending order of reception quality using CQI quantity information inputted by decoding section 107 and measurement value information inputted by reception quality measuring sections 113-1 to 113-$n$.

SC selecting section 127 then outputs the selected sub-carriers as SC number information to CQI generating section 114 and encoding section 117.

In this way, SC selecting section 127 selects the number of sub-carriers designated by control station apparatus.

Not only in the event that the sub-carriers are selected in descending order of reception quality, SC selecting section 127 may also set a predetermined threshold value and select a number of arbitrary sub-carriers designated by the CQI quantity information from sub-carriers of reception quality of the threshold value or higher.

Figure 2:
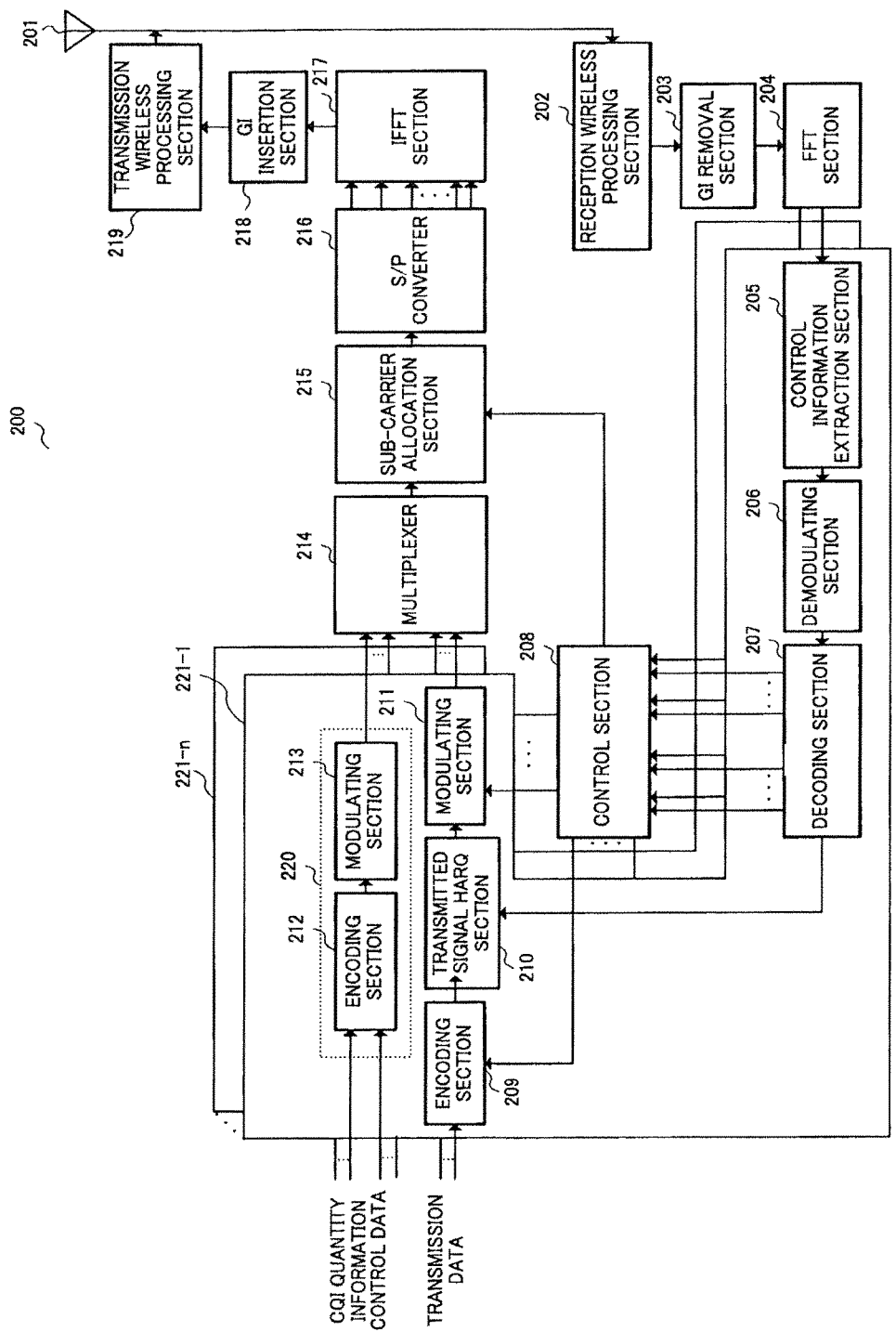
FIG. 2 is a block diagram showing a configuration of a base station apparatus of Embodiment 1 of the present invention.

Next, a configuration for a base station apparatus as a higher-level station apparatus of wireless communication apparatus 100 is described using FIG. 2.

FIG. 2 is a block diagram showing a configuration of base station apparatus 200.

Control information extraction section 205, demodulating section 206, decoding section 207, encoding section 209, transmission HARQ section 210, modulating section 211, encoding section 212 and demodulating section 213 constitute transmission data processing sections 221-1 to 221-$n$.

Transmission data processing sections 221-1 to 221-$n$ are provided for the number of users and each of transmission data processing sections 221-1 to 221-$n$ carries out processing on transmission data for transmission to one user.

Further, encoding section 212 and modulating section 213 constitute control data transmission processing section 220.

Reception wireless processing section 202 down converts a signal received at antenna 201 from a radio frequency to a baseband frequency and suchlike and outputs to GI removal section 203.

GI removal section 203 removes GI from the received signal inputted by reception wireless processing section 202 and outputs to FFT section 204.

After a received signal inputted by GI removal section 203 is converted from serial data format to parallel data format, FFT section 204 separates the received signal for each user and outputs to respective control information extraction section 205.

Control information extraction section 205 then extracts control information from the received signal inputted by FFT section 204 and outputs to demodulating section 206.

Demodulating section 206 then demodulates control information inputted by control information extraction section 205 and outputs to decoding section 207. Decoding section 207 decodes the received signal inputted by demodulating section 206 and outputs CQIs for each of the designated number of sub-carriers included in the received signal to control section 208.

Further, decoding section 207 decodes the received signal inputted by demodulating section 206 and outputs SC number information included in the received signal to control section 208.

Moreover, decoding section 207 decodes the received signal inputted by demodulating section 206 and outputs a NACK signal or ACK signal included in the received signal to transmission HARQ section 210.

Control section 208 as a scheduling section carries out scheduling based on a scheduling algorithm using CQIs and SC number information for wireless communication apparatus 100 of each user inputted by decoding section 207, and adaptively selects MCS (Modulation Coding Schemes} for the M-ary numbers and encoding rates and suchlike.

In other words, control section 208 is capable of determining reception quality every sub-carrier of each wireless communication apparatus 100 using the CQIs and SC number information for each sub-carrier transmitted from the wireless communication apparatus 100 for each user. The MCS is then selected according to reception quality for each sub-carrier of each wireless communication apparatus 100.

Control section 208 has knowledge of the number of sub-carriers, and it is possible to allocate transmission data to be sent to each wireless communication apparatus 100, to each sub-carrier within the range of usable sub-carriers.

At this time, control section 208 carries out the allocation, determining reception quality for sub-carriers for which CQIs have not been transmitted by wireless communication apparatus 100 as being the poorest.

Control section 208 outputs encoding rate information selected for each sub-carrier to encoding section 209 and outputs modulation scheme information selected for each sub-carrier to modulating section 211, and also outputs information on sub-carriers allocated to each wireless communication apparatus 100 using scheduling to sub-carrier allocation section 215.

Encoding section 209 encodes inputted transmission data based on encoding rate information inputted by control section 208, and outputs to transmission HARQ section 210.

Transmission HARQ section 210 outputs transmission data inputted by encoding section 209 to modulating section 211 and temporarily holds transmission data outputted to modulating section 211.

In the event that a NACK signal is inputted by decoding section 207, a re-transmission is requested by wireless communication apparatus 100, and therefore transmission HARQ section 210 outputs temporarily held transmission data for which output is complete to modulating section 211 again.

On the other hand, in the event that an ACK signal is inputted by demodulating section 207, transmission HARQ section 210 outputs new transmission data to modulating section 211.

Modulating section 211 modulates transmission data inputted by transmission HARQ section 210 based on modulation scheme information inputted by control section 208 and outputs to multiplexer 214.

Encoding section 212 then encodes control data and CQI quantity information inputted by a control station apparatus (not shown) as a higher-level station apparatus of base station apparatus 200, and outputs to modulating section 213.

The CQI quantity information is not limited to being inputted by the control station apparatus and may also be set by base station apparatus 200.

Further, the CQI quantity information can also be set taking into consideration number of users and volume of traffic.

Moreover, this may be set as a value corresponding to reception capability of every mobile station.

Modulating section 213 modulates control data and CQI quantity information inputted by encoding section 212 and outputs to multiplexer 214.

Multiplexer 214 multiplexes transmission data inputted by modulating section 211 and control data and CQI quantity information inputted by modulating section 213 for data to be transmitted to wireless transmission apparatus 100 of each user and outputs to sub-carrier allocation section 215.

CQI quantity information is information specific to the wireless communication apparatus 100 of each user.

Sub-carrier allocation section 215 rearranges multiplexed signals inputted by multiplexer 214 based on sub-carrier information for each wireless communication apparatus 100 inputted by control section 208 and outputs to S/P converter 216.

S/P converter 216 converts transmission data inputted by sub-carrier allocation section 215 from serial data format to parallel data format and outputs to IFFT section 217.

IFFT section 217 subjects transmission data inputted by S/P converter 216 to IFFT and outputs to GI insertion section 218.

Transmission data transmitted to each of wireless communication apparatus 100 subjected to IFFT at IFFT section 217 is then allocated to frequency-scheduled sub-carriers at control section 208.

GI insertion section 218 inserts GI's into transmission data inputted from IFFT section 217 and outputs to a transmission wireless processing section 219.

Transmission wireless processing section 219 up converts, etc., transmission data inputted from GI insertion section 218 from a baseband frequency to a radio frequency and transmits from antenna 201.

Figure 3:
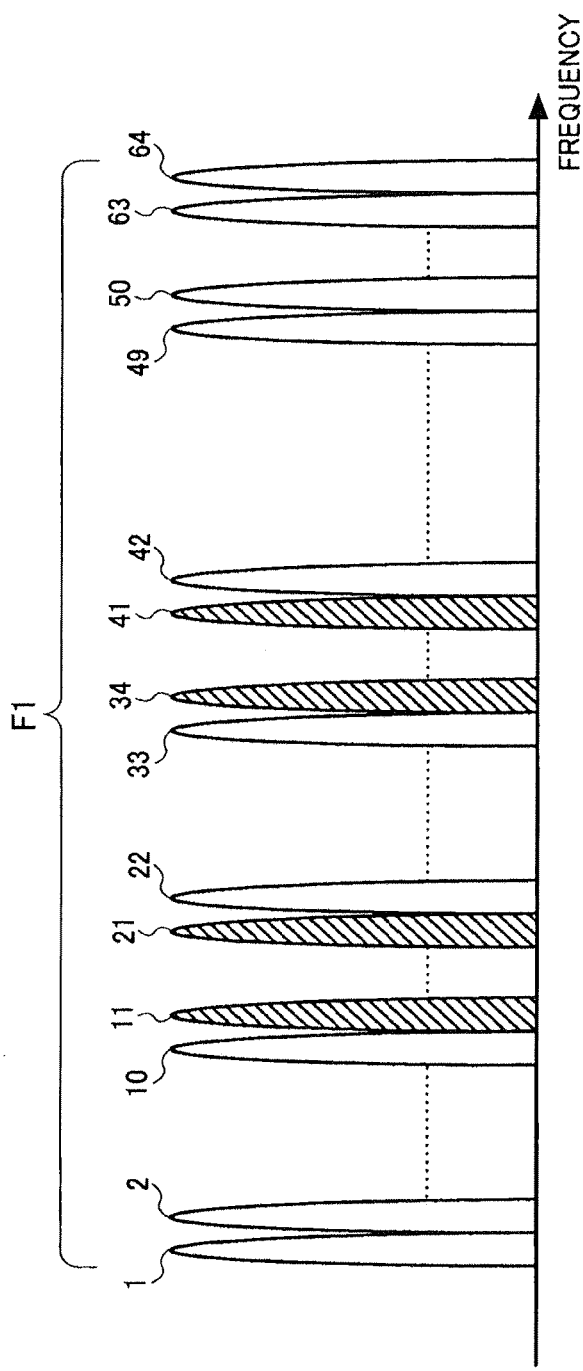
FIG. 3 is a diagram showing an arrangement of sub-carriers on a frequency axis of Embodiment 1 of the present invention.
Figure 4:
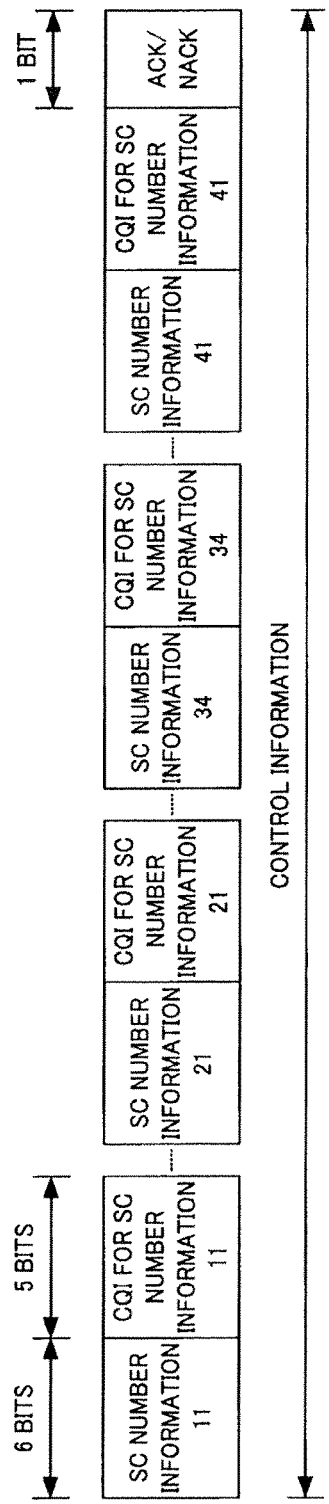
FIG. 4 is a diagram showing a signal format of Embodiment 1 of the present invention.
Figure 5:
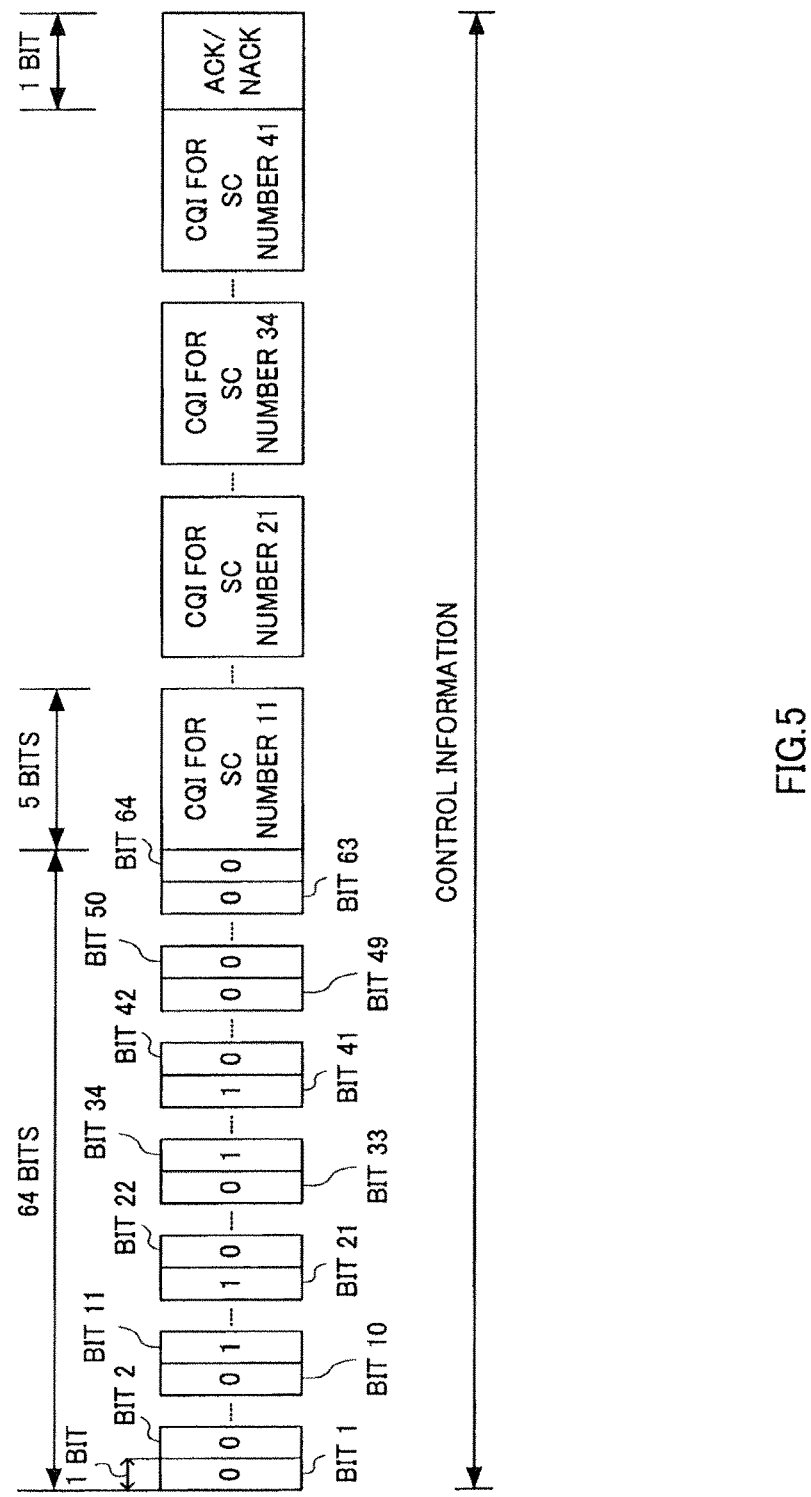
FIG. 5 is a diagram showing a signal format of Embodiment 1 of the present invention.

Next, a description is given of a method for selecting sub-carriers at wireless communication apparatus 100 and format for transmission signals during transmission of the CQIs of the selected sub-carriers using FIG. 3 to FIG. 5.

FIG. 3 is a diagram showing sixty-four sub-carriers allocated within a range of a predetermined communication bandwidth F1.

Base station apparatus 200 sends high-speed packet data to the wireless communication apparatus 100 of all the users using the sub-carriers 1 to 64.

In the event that the reception quality of sub-carriers 11 to 21 and sub-carriers 34 to 41 is good from the reception quality measurement results at reception quality measuring sections 113-1 to 113-n, SC selecting section 127 selects sub-carriers 11 to 21 and sub-carriers 34 to 41.

CQI generating section 114 generates CQIs for only sub-carriers 11 to 21 and sub-carriers 34 to 41, and generates SC number information for sub-carriers 11 to 21 and sub-carriers 34 to 41.

On the other hand, CQI generating section 114 does not generate CQIs and SC number information for sub-carriers other than sub-carrier 11 to 21 and sub-carrier 34 to 41.

FIG. 4 is a diagram showing a format for a signal transmitted from wireless communication apparatus 100 to base station apparatus 200.

Items of six-bit SC number information and five-bit CQIs are then paired together to constitute one item of sub-carrier control information.

As shown in FIG. 4, control information outputted by multiplexer 122 is a signal resulting from time-division-multiplexing of a pair of control information items for each sub-carrier for which CQIs are generated at CQI generating section 114 and a one-bit ACK/NACK signal.

FIG. 5 is a diagram showing a further example of a format for a signal transmitted from wireless communication apparatus 100 to base station apparatus 200.

One item of sub-carrier control information is constituted by one bit of SC number information and five bits of CQI.

As shown in FIG. 5, control information outputted by multiplexer 122 is a signal resulting from time-division-multiplexing of SC number information of 64 bits from the top for 64 sub-carriers, CQIs for only the sub-carriers for which CQIs are generated at CQI generating section 114, and one bit of ACK/NACK signal.

The SC number information is information time-division-multiplexed in order from the first sub-carrier of the 64 sub-carriers, with SC number information for sub-carriers for which CQIs are generated being indicated as "1", and SC number information for sub-carriers for which CQIs are not generated as "0".

As a result, bit 1, bits 2 to 10, bits 22 to 33 and bits 42 to 64 are indicated as "0", and bits 11 to 21 and bits 34 to 41 are indicated as "1".

At base station apparatus 200 receiving the CQIs and SC number information, control section 208 carries out scheduling of each sub-carrier for each wireless communication apparatus 100 by prioritizing allocation of sub-carriers 11 to 21 and sub-carriers 34 to 41.

Further, it can also be considered to map data (for example, control data of high importance or playback data, etc.) for which it is necessary to make the number of errors small with respect to the sub-carriers.

According to this Embodiment 1, a number of sub-carriers for which reception quality is good designated by a base station apparatus are selected and CQIs are generated and transmitted for the selected sub-carriers. Therefore, it is possible to increase the data capacity that can be transmitted and reduce power consumption by reducing the signal volume transmitted through the uplink and also possible to increase system capacity by reducing interference with respect to other wireless communication apparatuses.

Also, according to Embodiment 1, CQIs are generated only for selected sub-carriers and processing time while generating CQIs can therefore be made short. Further, according to this embodiment, designation upon selecting sub-carriers for which CQI's are generated may be achieved simply by transmitting designation information designating the quantity of CQI's from the base station apparatus. It is therefore possible to reduce the amount of signal transmitted through the uplink without increasing the amount of signal transmitted through the downlink.

Embodiment 2

Figure 6:
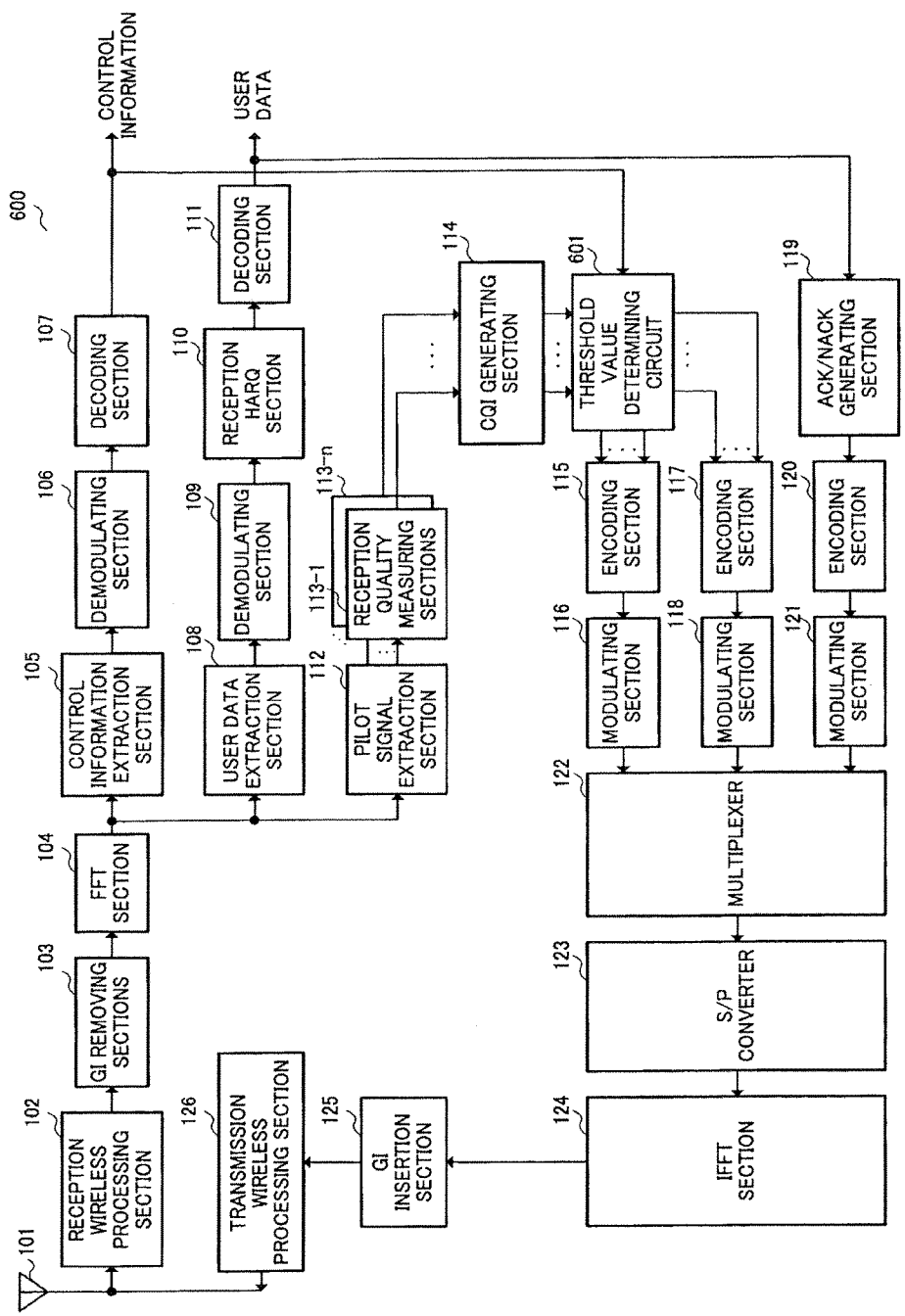
FIG. 6 is a block diagram showing a configuration of a wireless communication apparatus of Embodiment 2 of the present invention.

FIG. 6 is a block diagram showing a configuration for a wireless communication apparatus 600 according to Embodiment 2 of the present invention.

As shown in FIG. 6, wireless communication apparatus 600 according to Embodiment 2 is of a configuration where SC selecting section 127 is omitted and a threshold value determining section 601 is added in wireless communication apparatus 100 of Embodiment 1 shown in FIG. 1.

In FIG. 6, portions with the same configuration as for FIG. 1 are given the same numerals and are not described.

Further, the configuration of the base station apparatus with the exception of sending CQI threshold value information instead of CQI quantity information is the same as the configuration of FIG. 2 and is therefore not described.

Decoding section 107 decodes demodulated control information inputted by demodulating section 106 and outputs control information, and outputs CQI threshold value information contained in the control information to a threshold value determining section 601.

CQI generating section 114 generates CQIs for each sub-carrier for all of the sub-carriers using measurement value information inputted by reception quality measuring section 113.

In other words, CQI generating section 114 has a reference table that stores information for CQI selection use to which different CQIs are allocated every predetermined region for measurement values indicating reception quality separated by threshold values for use in selection of the plurality of CQIs, and selects CQIs by referring to information for CQI selection use employing measurement value information inputted by reception quality measuring section 113.

CQI generating section 114 outputs the generated CQIs to threshold value determining section 601.

CQI generating section 114 is not limited to the case of generating CQIs for all sub-carriers, and CQIs may be generated after sub-carriers are selected by determining threshold values for reception quality for each sub-carrier Threshold value determining section 601 as a selecting section selects only CQIs for which the reception quality is greater than or equal to a threshold value using CQIs, which are inputted by CQI generating section 114, and CQI threshold value information, which is a first threshold value inputted by decoding section 107, outputs the selected CQIs to encoding section 115, and outputs SC number information for the selected CQIs to encoding section 117.

Specifically, in the case of using CQI for eight levels of level 1 to 8, only CQIs of level 5 or greater are selected when a threshold value is level 5 or more, and only CQIs of level 4 or greater are selected when a threshold value is level 4 or more.

Threshold value determining section 601 is capable of adopting a method of outputting information for eight levels indicating which level of eight levels, level 1 to level 8, a selected CQI is at, or a method of outputting information of a relative value where, in the event that, for example, a threshold value is level 5 or more and a generated CQI is level 7, a value 2 that is a relative value with respect to the threshold value is outputted.

In the case of adopting the method of outputting information for eight levels, three bits are required in order to express levels 1 to 8. In the case of adopting a method of outputting relative value information, if a difference in threshold value is 0 to 3, then only two bits of information are sufficient. The amount of signals transmitted can therefore be reduced in the case of transmitting relative value information.

In the case of adopting the method of outputting relative value information, the base station stores threshold value information which is in common with wireless communication apparatus 600.

The method for selecting CQIs at wireless communication apparatus 600 and format for transmitting signals during transmission of the selected CQIs is the same as for FIG. 3 to FIG. 5 and is therefore not described.

According to Embodiment 2, the present invention selects sub-carriers satisfying reception quality of a threshold value or more designated by the base station apparatus and generates and transmits CQIs for the selected sub-carriers. By reducing the signal volume transmitted through the uplink, it is possible to increase the data capacity that can be transmitted and reduce power consumption, and, by reducing interference with respect to other wireless communication apparatuses, it is possible to increase system capacity.

Further, according to Embodiment 1, designation upon selecting sub-carriers for which CQIs are generated may be achieved simply by transmitting designation information designating a threshold value from the base station apparatus. It is therefore possible to reduce the amount of signal transmitted through the uplink without increasing the amount of signal transmitted through the downlink.

Embodiment 3

Figure 7:
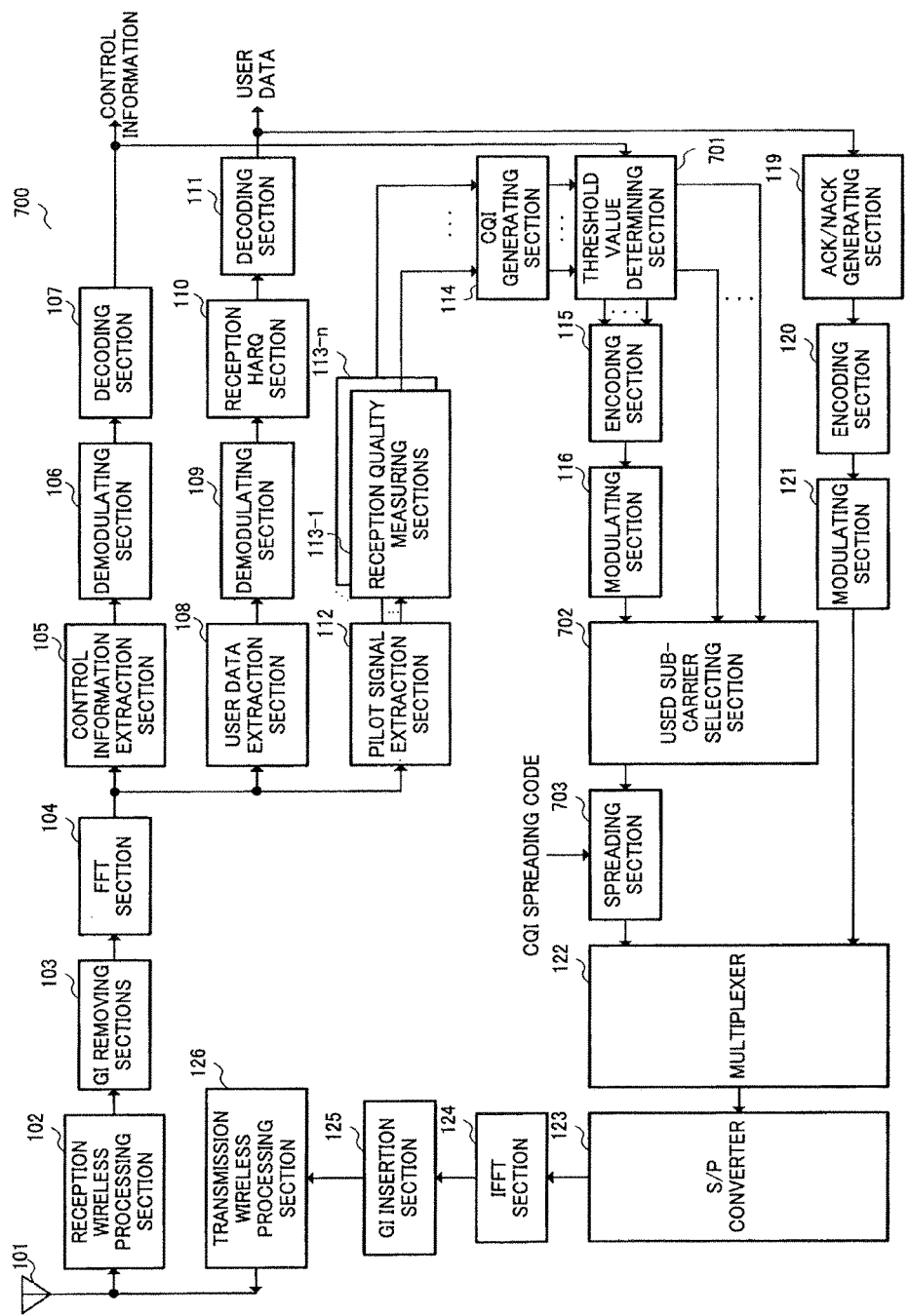
FIG. 7 is a block diagram showing a configuration of a wireless communication apparatus of Embodiment 3 of the present invention.

FIG. 7 is a block diagram showing a configuration of a wireless communication apparatus 700 according to Embodiment 3 of the present invention.

As shown in FIG. 7, wireless communication apparatus 700 of Embodiment 3 is of a configuration where encoding section 117, demodulating section 118, and SC selecting section 127 are removed, and threshold value determining section 701, used sub-carrier selecting section 702 and spreading section 703 are added in wireless communication apparatus 100 of Embodiment 1 shown in FIG. 1.

In FIG. 7, portions with the same configuration as for FIG. 1 are given the same numerals and are not described.

CQI generating section 114 generates CQIs for each sub-carrier for all of the sub-carriers using measurement value information inputted by reception quality measuring section 113.

In other words, CQI generating section 114 has a reference table that stores information for CQI selection use to which different CQIs are allocated every predetermined region for measurement values indicating reception quality separated by threshold values for use in selection of the plurality of CQIs, and selects CQIs by referring to information for CQI selection use employing measurement value information inputted by reception quality measuring section 113.

CQI generating section 114 outputs the generated CQIs to threshold value determining section 701.

The CQI generating section is not limited to the case of generating CQIs for all sub-carriers, and CQIs may be generated after sub-carriers are selected by determining threshold values for reception quality for each sub-carrier.

Threshold value determining section 701 as a selecting section selects only CQIs for which the reception quality is greater than or equal to a threshold value using CQI's, which are inputted by CQI generating section 114, and CQI threshold value information, which is inputted by decoding section 107, outputs the selected CQIs to encoding section 115, and outputs SC number information for the selected CQIs to used sub-carrier selecting section 702.

As with the threshold value determining section 601 of Embodiment 2, threshold determining section 701 is capable of threshold value determination adopting either of a method of outputting information for eight levels indicating which of the eight levels, levels 1 to 8, the selected CQI's are at or a method of outputting relative value information.

Used sub-carrier selecting section 702 selects sub-carriers, for which CQIs are generated using SC number information inputted by threshold value determining section 701, or sub-carriers, which have in advance a one-to-one correspondence with such sub-carriers, as transmission sub-carriers, and outputs CQIs to spreading section 703.

Spreading section 703 subjects each CQI inputted by used sub-carrier selecting section 702 to spreading processing using CQI spreading code, allocates CQI signals to sub-carriers allocated by used sub-carrier selecting section 702 and outputs to multiplexer 122.

The CQI spreading code is a spreading code that differs every wireless communication apparatus 700 of each user and the same spreading code is used for the sub-carriers and CQIs of all of wireless communication apparatus 700 of each user.

The SC number information is not subjected to spreading processing by spreading section 703 because SC number information is not transmitted.

Multiplexer 122 multiplexes CQIs inputted by spreading section 703 and NACK signals or ACK signals inputted by modulating section 121 and outputs to S/P converter 123.

The multiplexed signal multiplexed at multiplexer 122 comes into a state where CQI of each sub-carrier is allocated to the sub-carrier itself, or where CQI' of each sub-carrier is allocated to a sub-carrier which has one to one correspondence with each sub-carrier.

The details of the method for allocating sub-carriers will be described later.

Figure 8:
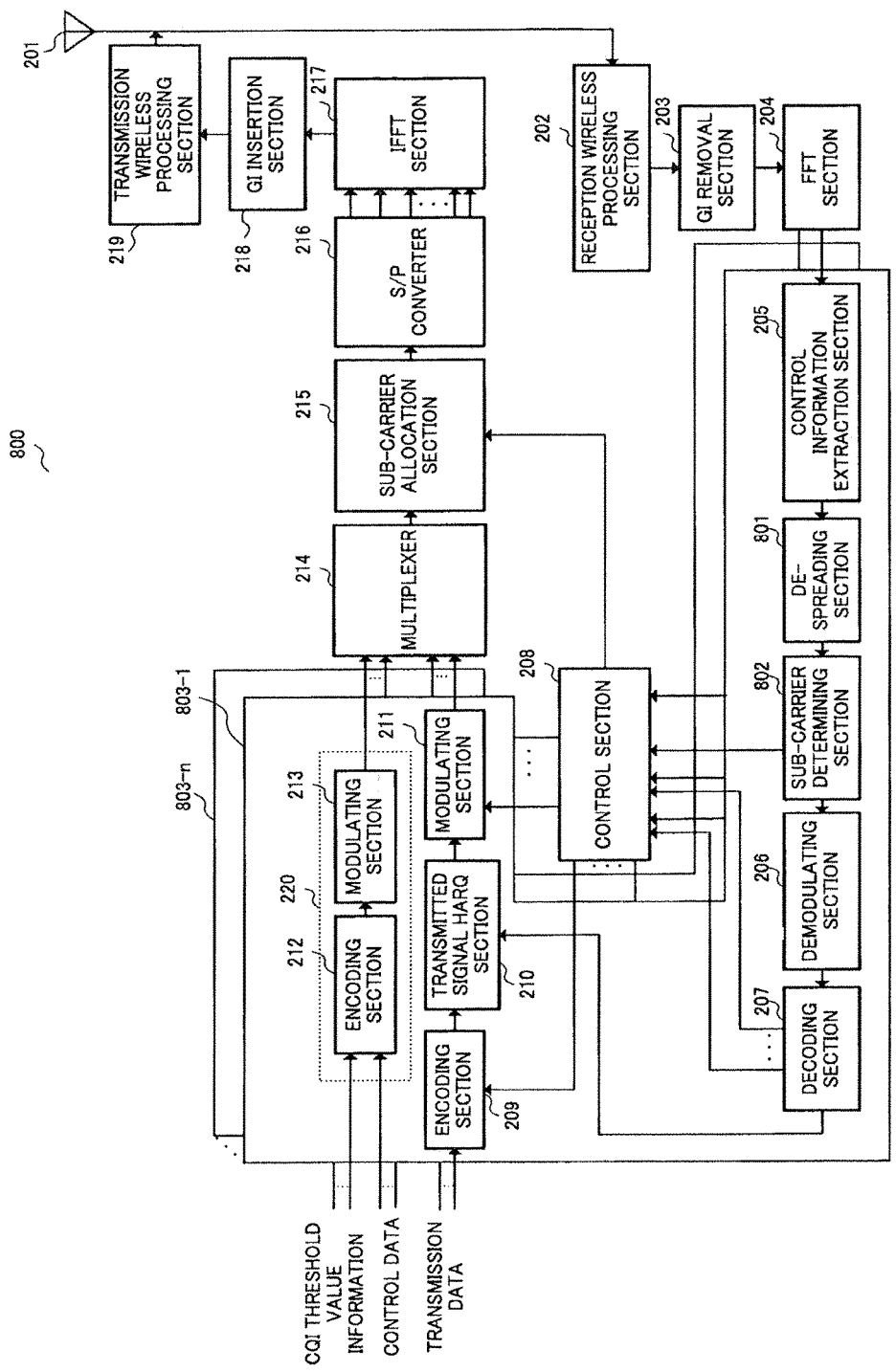
FIG. 8 is a block diagram showing a configuration of a base station apparatus of Embodiment 3 of the present invention.

Next, a description is given using FIG. 8 of a configuration for a base station apparatus of Embodiment 3.

FIG. 8 is a block diagram showing a configuration of a base station apparatus 800.

As shown in FIG. 8, a base station apparatus 800 according to Embodiment 3 is of a configuration where de-spreading section 801 and sub-carrier determining section 802 are added in base station apparatus 200 of embodiment 1 shown in FIG. 2.

In FIG. 8, portions with the same configuration as for FIG. 2 are given the same numerals and are not described.

Transmission data processing sections 803-1 to 803-n are comprised of control information extraction section 205, demodulating section 206, decoding section 207, encoding section 209, transmission HARQ section 210, modulating section 211, encoding section 212, demodulating section 213, de-spreading section 801 and sub-carrier determining section 802.

Transmission data processing sections 803-1 to 803-n are provided for the number of users and each of transmission data processing sections 803-1 to 803-n carries out processing on transmission data for transmission to one user.

De-spreading section 801 stores a plurality of spreading codes used at wireless communication apparatus 700 of one user with which base station apparatus 800 is carrying out communication.

De-spreading section 801 then subjects all of the sub-carriers inputted by control information extraction section 205 to de-spreading processing using the stored de-spreading code and outputs this to sub-carrier determining section 802.

Different spreading codes are stored at each of the de-spreading sections 801 of each of the transmission data processing sections 803-1 to 803-n because a different spreading code is used at each wireless communication apparatus 700.

Sub-carrier determining section 802 determines a sub-carrier, of which de-spreading output inputted by de-spreading section 801 is greater than or equal to a threshold value, to be a sub-carrier selected at wireless communication apparatus 700, and outputs SC number information of a sub-carrier with reception quality of greater than or equal to the threshold value to control section 208 and demodulating section 206.

Because SC number information is not transmitted by wireless communication apparatus 700, sub-carrier determining section 802 stores in advance SC number information that is in common to wireless communication apparatus 700.

Further, the reception quality is taken to be a relative value with respect to the pilot signal taking into consideration fluctuation in reception quality due to fading.

Decoding section 207 decodes the received signal inputted by demodulating section 206 and outputs CQIs for each of the designated number of sub-carriers included in the received signal to control section 208.

Moreover, decoding section 207 decodes the received signal inputted by demodulating section 206 and outputs a NACK signal or ACK signal included in the received signal to transmission HARQ section 210.

Control section 208 carries out scheduling based on CQIs of wireless communication apparatus 700 for each user inputted by decoding section 207 and SC number information for wireless communication apparatus 700 of each user inputted by sub-carrier determining section 802, and MCS including M-ary numbers and encoding rates, etc., are adaptively selected.

In other words, control section 208 is capable of determining reception quality every sub-carrier for each wireless communication apparatus 700 using CQIs for each sub-carrier sent by wireless communication apparatus 700 of each user and SC number information for wireless communication apparatus 700 of each user inputted by sub-carrier determining section 802. MCS is then selected according to reception quality of each sub-carrier for each wireless communication apparatus 700.

Control section 208 is capable of allocating data to be transmitted to each wireless communication apparatus 700 to sub-carriers of good reception quality at each wireless communication apparatus 700.

Control section 208 has knowledge of the number of usable sub-carriers and allocates transmission data sent to each wireless communication apparatus 700 within the range of usable sub-carriers to each sub-carrier.

At this time, control section 208 carries out allocation, determining reception quality of a sub-carrier for which CQIs has not been transmitted by wireless communication apparatus 700 as being the poorest.

Control section 208 outputs encoding rate information selected for each sub-carrier to encoding section 209, outputs modulation scheme information selected for each sub-carrier to modulating section 211 and outputs sub-carrier information allocated to each wireless communication apparatus 700 using scheduling to a sub-carrier allocation section 215.

Figure 9:
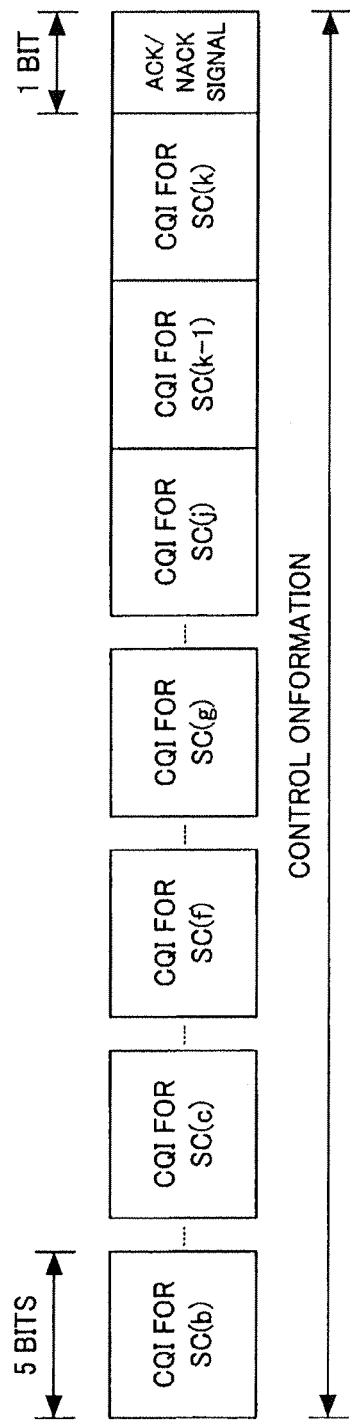
FIG. 9 is a diagram showing a signal format of Embodiment 3 of the present invention.

Next, a description is given using FIG. 3 and FIG. 9 of a method for selecting CQIs occurring at wireless communication apparatus 700 for allocation to sub-carriers, and a format for a transmission signal when transmitting selected CQIs.

It is possible to adopt two methods, a method where CQI' of each sub-carrier is allocated to the sub-carrier itself, or a method where CQI' of each sub-carrier is allocated to another sub-carrier with a one-to-one correspondence, as methods for allocating sub-carriers.

First, a description is given of a method for allocating CQIs of each sub-carrier to the sub-carrier itself.

In FIG. 3, in the event that the reception quality of sub-carriers 11 to 21 and sub-carriers 34 to 41 is good from reception quality measurement results at the reception quality measuring sections 113-1 to 113-$n$, threshold value determining section 701 selects the CQIs of sub-carriers 11 to 21 and sub-carriers 34 to 41, used sub-carrier selecting section 702 allocates CQIs for sub-carriers 11 to 21 to sub-carriers 11 to 21, and the CQIs for sub-carriers 34 to 41 are allocated to the sub-carriers 34 to 41.

On the other hand, threshold value determining section 701 does not select CQIs and SC number information for sub-carriers other than sub-carrier 11 to 21 and sub-carrier 34 to 41.

Next, a description is given of a method for allocating CQI of each sub-carrier to another sub-carrier with a one-to-one correspondence.

In FIG. 3, in the event that the reception quality of sub-carriers 11 to 21 and sub-carriers 34 to 41 is good from reception quality measurement results at reception quality measuring sections 113-1 to 113-$n$, threshold value determining section 701 selects the CQIs of sub-carriers 11 to 21 and sub-carriers 34 to 41, used sub-carrier selecting section 702 allocates CQIs for sub-carriers 11 to 21 to sub-carriers 22 to 32 each having a one-to-one correspondence, and the CQIs of sub-carriers 34 to 41 are allocated to the sub-carriers 51 to 57 each having a one-to-one correspondence.

On the other hand, threshold value determining section 701 does not select CQIs and SC number information for sub-carriers other than sub-carrier 11 to 21 and sub-carrier 34 to 41.

By storing sub-carriers having one-on-one correspondence with sub-carriers for which CQIs are generated at wireless communication apparatus 700 and base station apparatus 800 in advance, base station apparatus 800 can recognize which sub-carrier a received CQI is for.

FIG. 9 is a diagram showing a format for a signal transmitted from wireless communication apparatus 700 to base station apparatus 800.

As shown in FIG. 9, control information constituted of CQIs each having five bits and ACK signals or NACK signals for sub-carriers selected by a threshold value determination at threshold value determining section 701 is time division multiplexed and transmitted.

According to Embodiment 3, sub-carriers satisfying reception quality of a threshold value or more designated by the base station apparatus are selected and CQIs are generated and transmitted for the selected sub-carriers. By reducing the signal volume transmitted through the uplink, it is possible to increase the data capacity that can be transmitted and reduce power consumption and by reducing interference with respect to other wireless communication apparatuses, it is possible to increase system capacity.

Moreover, according to Embodiment 3, CQIs are allocated to selected sub-carriers with good reception quality and base station apparatus 800 is therefore capable of acquiring good quality CQIs.

Further, according to Embodiment 3, CQI generated for each sub-carrier is allocated to the sub-carrier itself. Base station apparatus 800 can therefore determine which sub-carrier CQI is for even without transmitting SC number information and the volume of signal transmitted can therefore be reduced by the amount resulting from not sending the SC number information.

Still further, in the event that the duplex scheme is TDD, the propagation path characteristics of the uplink and the downlink are substantially the same. It is therefore possible to use sub-carriers with good reception quality for the downlink as those for the uplink also.

In other words, it is possible to transmit a CQI signal using a superior propagation path.

Further, according to Embodiment 3, designation upon selecting sub-carriers for which CQIs are generated may be achieved simply by transmitting designation information designating a threshold value from the base station apparatus. It is therefore possible to reduce the amount of signal transmitted through the uplink without increasing the amount of signal transmitted through the downlink.

According to Embodiment 3, the sub-carriers and CQIs are subjected to spreading processing using a spreading code specific to wireless communication apparatus 700 of each user. In the event that CQIs are transmitted for the same sub-carrier by the wireless communication apparatus 700 of a plurality of users, it is possible for base station apparatus 800 to discriminate which wireless communication apparatus 700 of which user a CQI has been sent from.

Embodiment 4

Figure 10:
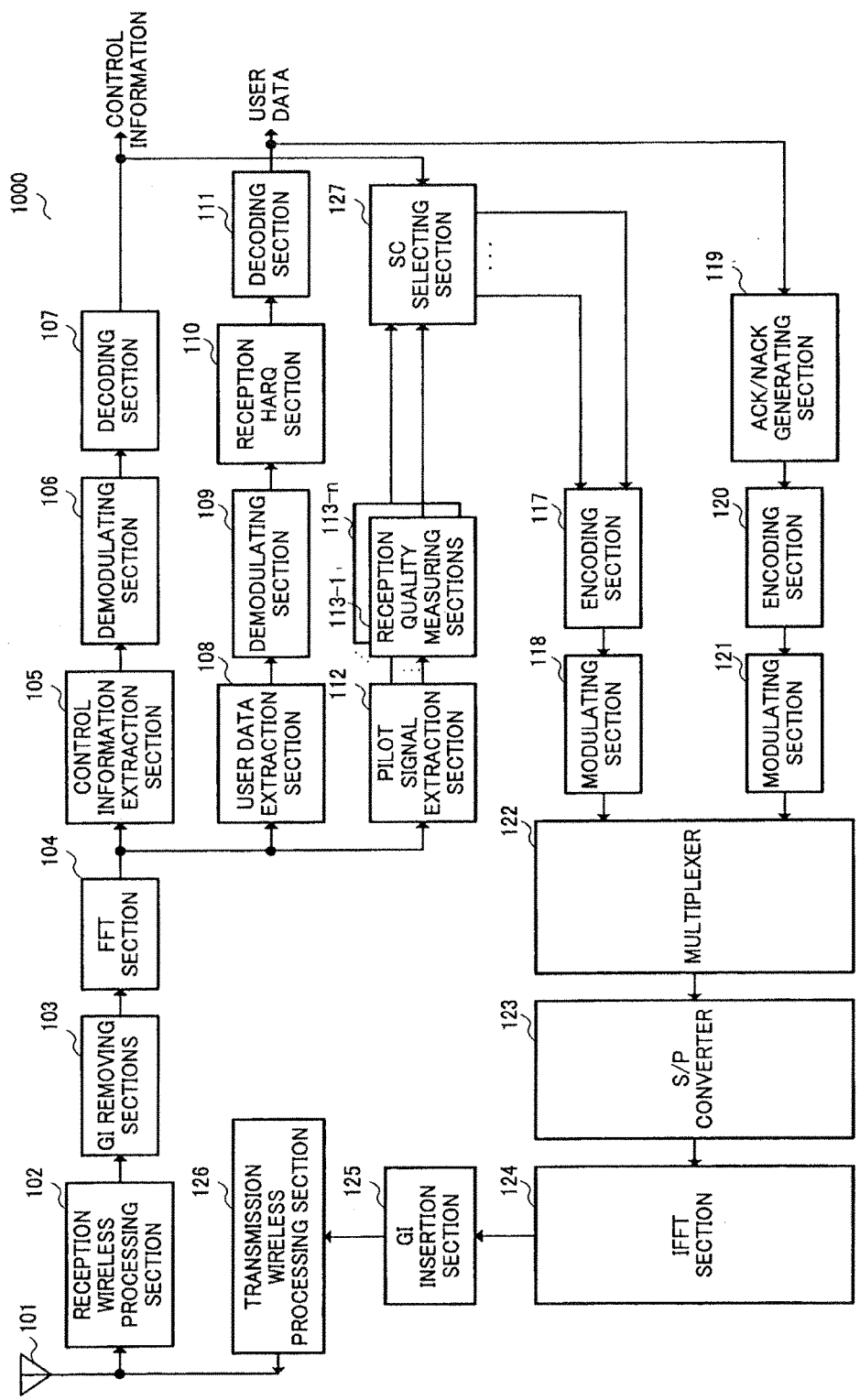
FIG. 10 is a block diagram showing a configuration of a wireless communication apparatus of Embodiment 4 of the present invention.

FIG. 10 is a block diagram showing a configuration for a wireless communication apparatus 1000 according to Embodiment 4 of the present invention.

As shown in FIG. 10, wireless communication apparatus 1000 of the fourth embodiment is of a configuration where CQI generating section 114, encoding section 115 and modulating section 116 are excluded in the wireless communication apparatus 100 of Embodiment 1 shown in FIG. 1.

In FIG. 10, portions with the same configuration as for FIG. 1 are given the same numerals and are not described.

SC selecting section 127 selects a number of sub-carriers designated by the CQI quantity information in order of good reception quality using CQI quantity information inputted by decoding section 107 and measurement value information inputted by the reception quality measuring sections 113-1 to 113-n.

SC selecting section 127 then outputs the selected sub-carriers as SC number information to encoding section 117.

Multiplexer 122 multiplexes SC number information inputted by the modulating section 118, and NACK signals or ACK signals inputted by modulating section 121 so as to generate transmission data and outputs the generated transmission data to S/P converter 123.

Figure 11:
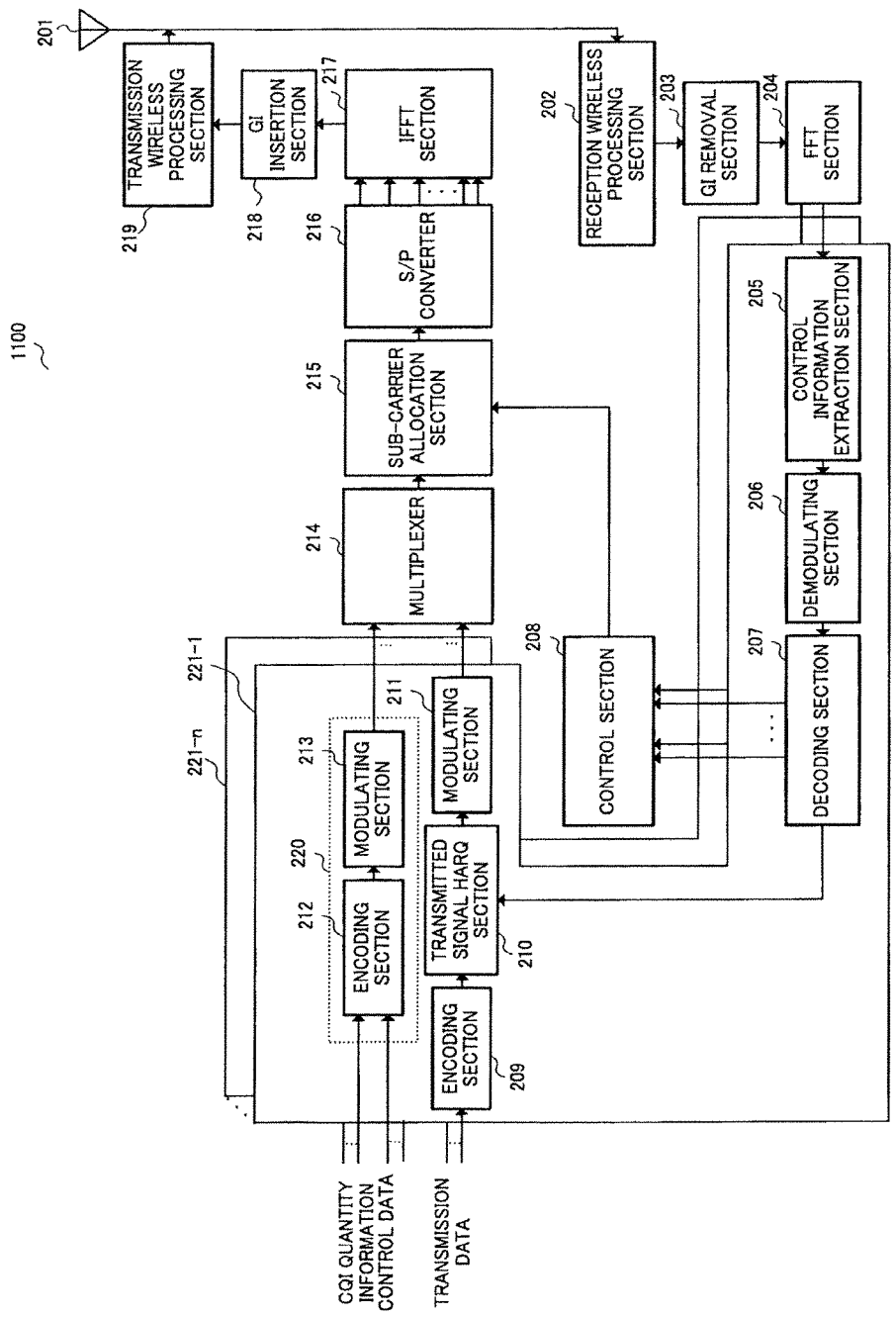
FIG. 11 is a block diagram showing a configuration of a base station apparatus of Embodiment 4 of the present invention.

Next, a description is given using FIG. 11 of a configuration for a base station apparatus 1100 of Embodiment 4.

FIG. 11 is a block diagram showing a configuration for base station apparatus 1100.

In FIG. 11, portions with the same configuration as for FIG. 2 are given the same numerals and are not described.

Decoding section 207 decodes the received signal inputted by demodulating section 206 and outputs SC number information included in the received signal to control section 208.

Moreover, decoding section 207 decodes the received signal inputted by demodulating section 206 and outputs a NACK signal or ACK signal included in the received signal to transmission HARQ section 210.

Control section 208 is able to be aware of sub-carriers of good reception quality at wireless communication apparatus 1000 of each user from SC number information for wireless communication apparatus 1000 of each user inputted by decoding section 207. Scheduling is therefore carried out based on a scheduling algorithm in such a manner that transmission data is allocated to sub-carriers of SC numbers with good reception quality.

In other words, control section 208 carries out scheduling in such a manner that transmission data is allocated in order from the top of the SC number because SC number is arranged in descending order of reception quality of sub-carriers.

Control section 208 outputs sub-carrier information for use in transmission to sub-carrier allocation section 215.

Encoding section 209 encodes transmission data at a fixed encoding rate set in advance and outputs to transmission HARQ section 210.

Modulating section 211 modulates transmission data inputted by transmission HARQ section 210 using a fixed modulation method set in advance and outputs to multiplexer 214.

Figure 12:
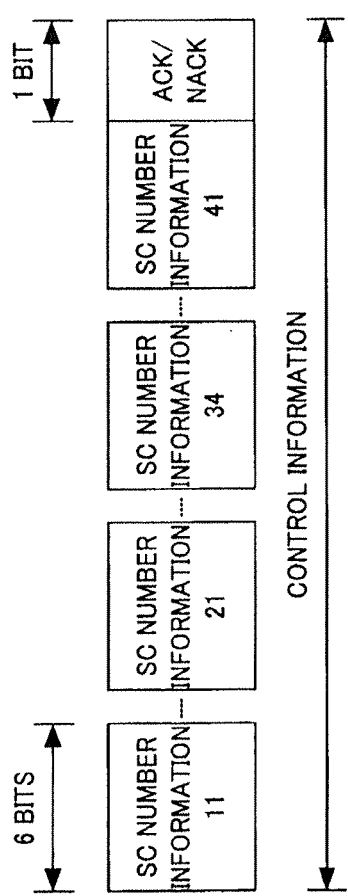
FIG. 12 is a diagram showing a signal format of Embodiment 4 of the present invention.

Next, a description is given of a method for selecting CQIs at wireless communication apparatus 1000 and format for transmission signals during transmission of the selected CQIs, using FIG. 3 and FIG. 12.

In FIG. 3, in the event that the reception quality of sub-carriers 11 to 21 and sub-carriers 34 to 41 is good from the reception quality measurement results at reception quality measuring sections 113-1 to 113-n, SC selecting section 127 outputs SC number information only for sub-carriers 11 to 21 and sub-carriers 34 to 41.

On the other hand, SC selecting section 127 does not output CQIs and SC number information for sub-carriers other than sub-carrier 11 to 21 and sub-carrier 34 to 41.

FIG. 12 is a diagram showing a format for a signal transmitted from wireless communication apparatus 1000 to base station apparatus 1100.

As shown in FIG. 12, control information outputted by multiplexer 122 is a signal of time-division-multiplexing of SC number information comprised of six bits for sub-carriers selected at SC selecting section 127 and a one-bit ACK/NACK signal.

Figure 13:
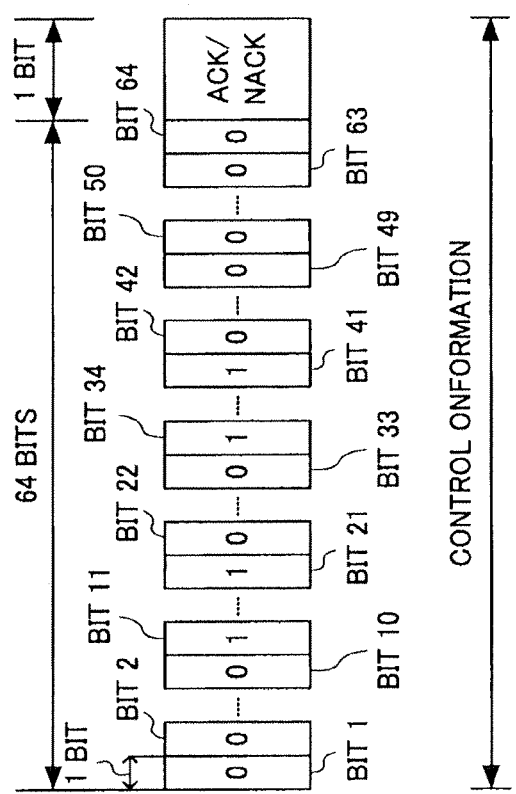
FIG. 13 is a diagram showing a signal format of Embodiment 4 of the present invention.

FIG. 13 is a diagram showing a further example of a format for a signal transmitted from wireless communication apparatus 1000 to base station apparatus 1100.

As shown in FIG. 13, control information outputted by multiplexer 122 is signal of time-division-multiplexing of SC number information of 64-bits from the top for each of the 64 sub-carriers and a one-bit ACK/NACK signal.

The SC number information is information time-division-multiplexed in order from the first sub-carrier of the 64 sub-carriers, with SC number information for sub-carriers that are selected being indicated as "1", and SC number information for sub-carriers that are not selected being indicated as "0".

Therefore, bit 1, bits 2 to 10, bits 22 to 33 and bits 42 to 64 are indicated as "0", and bits 11 to 21 and bits 34 to 41 are indicated as "1".

According to Embodiment 4, a number of sub-carriers designated by a base station apparatus as having good reception quality are selected and SC number information is sent to the selected sub-carriers. The volume of signal transmitted through the uplink can therefore be reduced compared to the case where CQIs and SC number information are both transmitted. It is therefore possible to increase the data capacity that can be transmitted and reduce power consumption, and increase system capacity by reducing interference with respect to other wireless communication apparatuses.

Further, according to Embodiment 4, designation upon selecting sub-carriers for which CQI's are generated may be achieved simply by transmitting designation information designating the number of CQIs from the base station apparatus. It is therefore possible to reduce the amount of signal transmitted through the uplink without increasing the amount of signal transmitted through the downlink.

Moreover, according to Embodiment 4, a base station apparatus is capable of carrying out encoding using encoding rates fixedly set in advance, modulation and suchlike. It is then possible to make circuits and apparatus smaller and reduce manufacturing costs by simplifying processing for encoding processing and modulation processing and so on.

Embodiment 5

Figure 14:
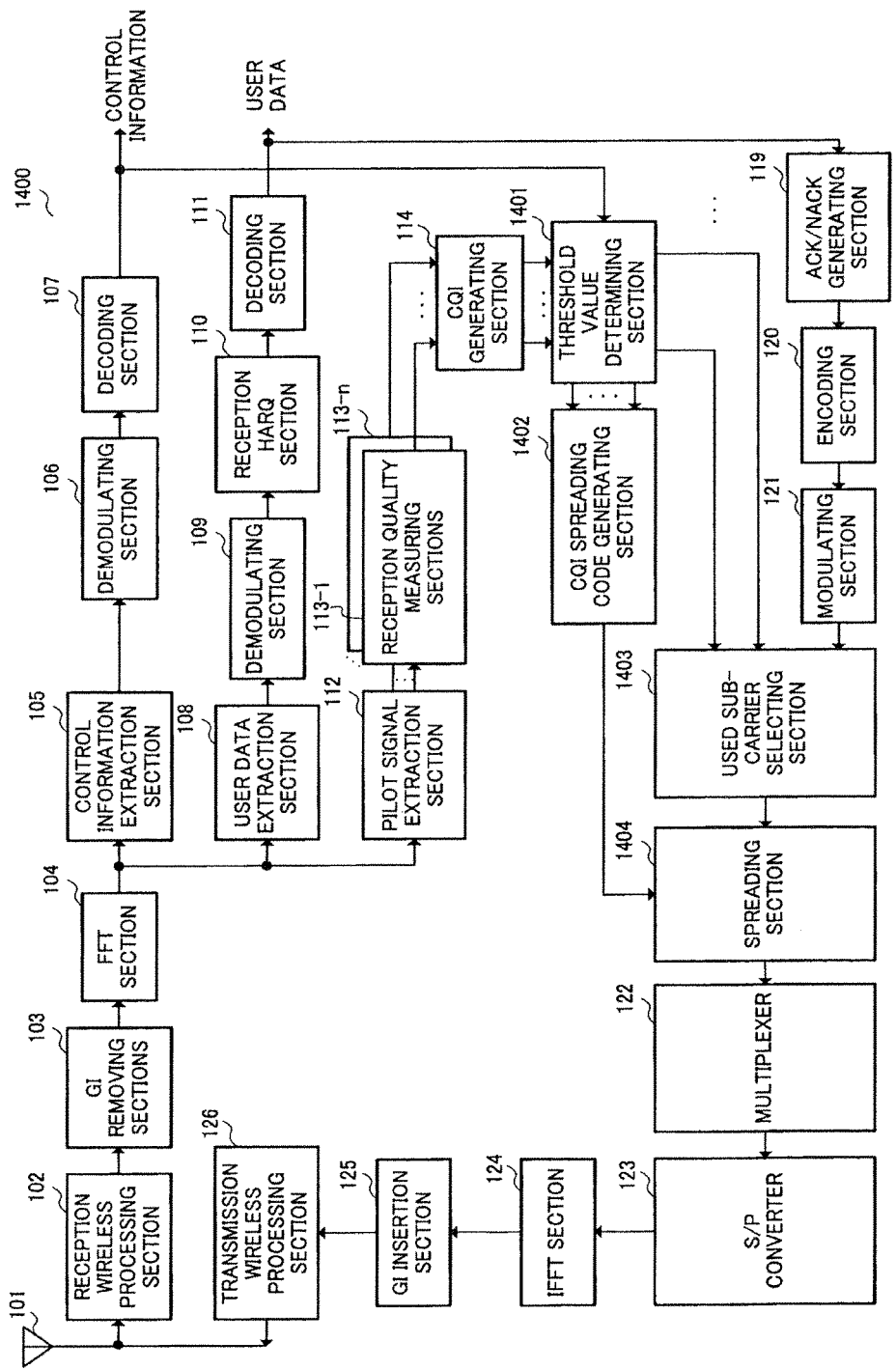
FIG. 14 is a block diagram showing a configuration of a wireless communication apparatus of Embodiment 5 of the present invention.

FIG. 14 is a block diagram showing a configuration for a wireless communication apparatus 1400 according to Embodiment 5 of the present invention.

As shown in FIG. 14, wireless communication apparatus 1400 of Embodiment 5 is of a configuration where encoding section 115, modulating section 116, encoding section 117, demodulating section 118, and SC selecting section 127 are removed, and threshold value determining section 1401, CQI spreading code generating section 1402, used sub-carrier selecting section 1403 and spreading section 1404 are added in wireless communication apparatus 100 of Embodiment 1 shown in FIG. 1.

In FIG. 14, portions with the same configuration as for FIG. 1 are given the same numerals and are not described.

Threshold value determining section 1401 as a selecting section selects only CQIs with reception quality greater than or equal to the threshold value using CQIs, which are reception quality information for selection use and inputted by CQI generating section 114, and CQI threshold value information, which is inputted by decoding section 107, outputs the selected CQIs to the CQI spreading code generating section 1402, and outputs SC number information for selected CQIs to the used sub-carrier selecting section 1403.

As with the threshold value determining section 601 of Embodiment 2, threshold determining section 1401 is capable of threshold value determination adopting either of a method of outputting eight levels of information indicating which of the eight levels, levels 1 to 8, the selected CQIs are at or a method of outputting relative value information.

This is not limited to selecting CQIs greater than or equal to a threshold value from CQIs for all of the sub-carriers, and it is also possible to select sub-carriers with reception quality greater than or equal to a threshold value before generating CQIs and only generating CQIs of the selected sub-carriers.

CQI spreading code generating section 1402 constituting a spreading code selection section has a reference table that stores CQI spreading code information which is spreading code selection information for providing a relationship between associating CQIs and spreading codes.

CQI spreading code generating section 1402 selects spreading codes by referring to CQI spreading code information using CQIs inputted by a threshold value determining section 1401 and outputs selected spreading code information to spreading section 1404.

Spreading codes in the CQI spreading code information are codes that are different at wireless communication apparatus 1400 of each user and are codes that are different for each CQI.

Used sub-carrier selecting section 1403 allocates an ACK signal or NACK signal as an error determination signal inputted by modulating section 121 to a sub-carrier selected using SC number information inputted by threshold value determining section 1401 and outputs to spreading section 1404.

In the event that a plurality of SC number information are inputted from threshold value determining section 1401, used sub-carrier selecting section 1403 allocates ACK signals or NACK signals to a plurality of sub-carriers reported using the SC number information.

Spreading section 1404 subjects sub-carriers allocated with ACK signals or NACK signals inputted by used sub-carrier selecting section 1403 to spreading processing using spreading codes inputted by the CQI spreading code generating section 1402 and outputs to multiplexer 122.

Figure 15:
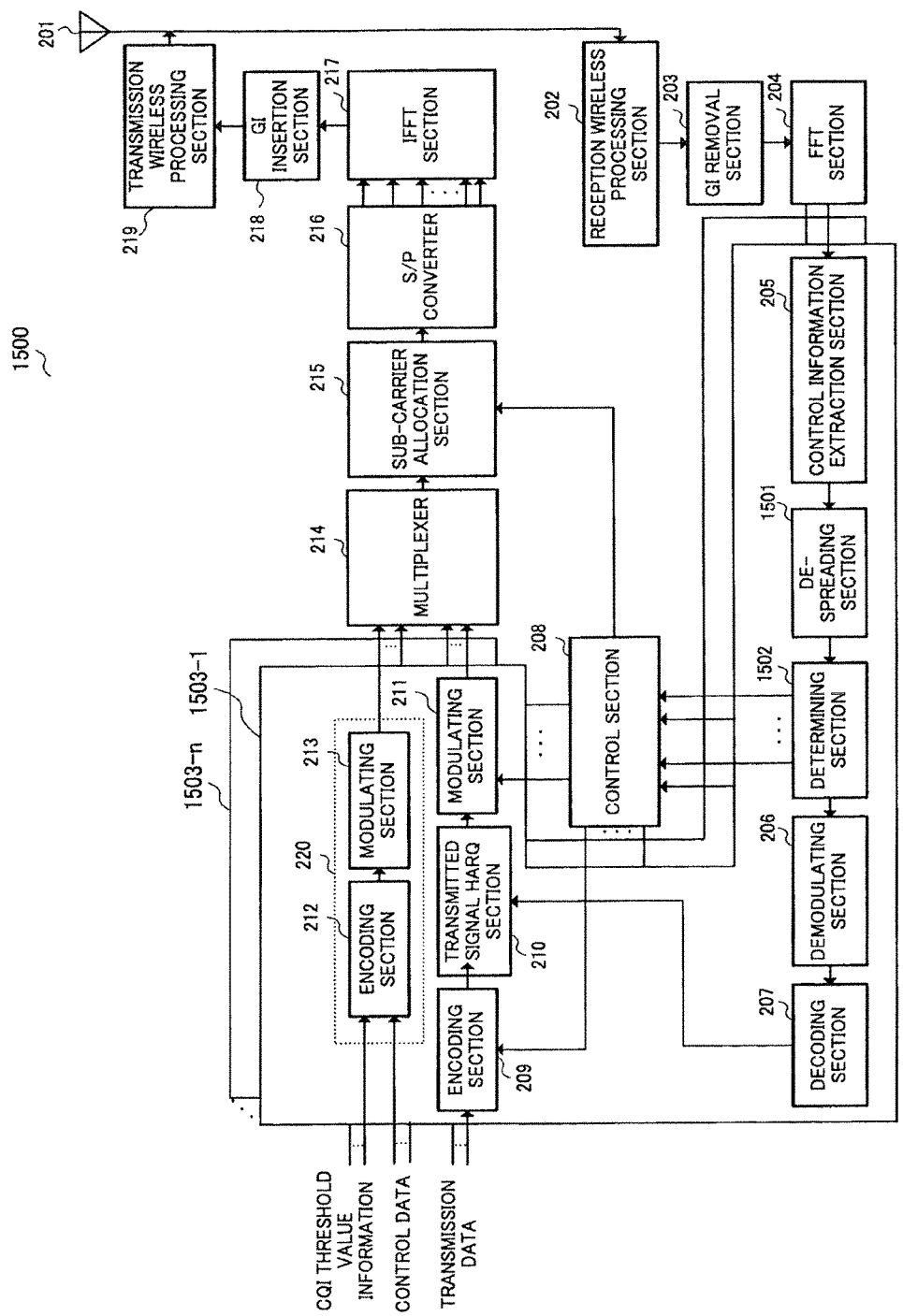
FIG. 15 is a block diagram showing a configuration of a base station apparatus of Embodiment 5 of the present invention.

Next, a description is given using FIG. 15 of a configuration for a base station apparatus of Embodiment 5.

FIG. 15 is a block diagram showing a configuration for base station apparatus 1500.

As shown in FIG. 15, base station apparatus 1500 of Embodiment 5 is of a configuration where a de-spreading section 1501 and a determining section 1502 are added in base station apparatus 200 of Embodiment 1 shown in FIG. 2.

In FIG. 15, portions with the same configuration as for FIG. 2 are given the same numerals and are not described.

Transmission data processing sections 1503-1 to 1503-$n$ are comprised of control information extraction section 205, demodulating section 206, decoding section 207, encoding section 209, transmission HARQ section 210, modulating section 211, encoding section 212, demodulating section 213, de-spreading section 1501 and determining section 1502.

Transmission data processing sections 1503-1 to 1503-$n$ are provided for the number of users and each of the transmission data processing sections 1503-1 to 1503-$n$ carries out processing on transmission data for transmission to one user.

De-spreading section 1501 stores in advance a plurality of spreading codes used at wireless communication apparatus 1400 of one user with which base station apparatus 1500 is carrying out communication.

De-spreading section 1501 then subjects all of the sub-carriers inputted by control information extraction section 205 to de-spreading processing using the stored de-spreading code and outputs to determining section 1502.

De-spreading sections 1501 of each of transmission data processing sections 1503-1 to 1503-$n$ stores in advance a different spreading code because a different spreading code is used at each wireless communication apparatus 1400.

Determining section 1502 has a reference table that stores CQI spreading code information for providing a relationship between the spreading code and CQIs, and stores spreading codes used by wireless communication apparatus 1400 of one user.

Determining sections 1502 of each of transmission data processing sections 1503-1 to 1503-$n$ stores in advance a different spreading code because a different spreading code is used at each wireless communication apparatus 1400.

CQI spreading code information is in common with CQI spreading code generating section 1402.

Determining section 1502 obtains a de-spreading output for received signals inputted by de-spreading section 1501 every sub-carrier, and compares the largest de-spreading output with a threshold value (a third threshold value) every sub-carrier.

Determining section 1502 determines sub-carriers whose largest de-spreading outputs are greater than or equal to the threshold value are sub-carriers selected by wireless communication apparatus 1400, selects CQIs of sub-carriers whose largest de-spreading outputs are greater than or equal to the threshold value by referring to CQI spreading code information using spreading codes employed in de-spreading of the largest de-spreading outputs, and outputs the selected CQIs to control section 208.

At this time, the de-spreading output is expressed as a relative value with respect to the received signal power of a pilot, taking into consideration fluctuation in received signal power due to fading.

Demodulating section 206 then de-modulates an ACK signal or NACK signal inputted by the determining section 1502 and outputs to decoding section 207.

Decoding section 207 then outputs the results of demodulating the ACK signal or NACK signal inputted by demodulating section 206 to transmission HARQ section 210.

Control section 208 carries out scheduling based on a scheduling algorithm using CQIs for wireless communication apparatus 1400 of each user inputted by determining section 1502, and adaptively selects MCS's for the M-ary numbers, encoding rates and suchlike.

In other words, control section 208 is capable of determining reception quality every sub-carrier for each wireless communication apparatus 1400 using CQIs every sub-carrier inputted by determining section 1502. MCS's are then selected according to reception quality of each sub-carrier for each wireless communication apparatus 1400.

Control section 208 has knowledge of the number of sub-carriers and it is possible to use and allocates transmission data to be sent to each wireless communication apparatus 1400 within the range of usable sub-carriers to each sub-carrier.

At this time, control section 208 carries out allocation, determining reception quality of a sub-carrier for which CQIs has not been inputted by determining section 1502 as being the poorest.

Control section 208 outputs encoding rate information selected for each sub-carrier to encoding section 209, outputs modulation scheme information selected for each sub-carrier to modulating section 211 and outputs sub-carrier information allocated to each wireless communication apparatus 1400 using scheduling to sub-carrier allocation section 215.

Next, a description is given using FIG. 3 of a method for selecting sub-carriers at wireless communication apparatus 1400.

Used sub-carrier selecting section 1403 allocates ACK signals or NACK signals to sub-carriers 11 to 21 and sub-carriers 34 to 41.

Control information multiplexed at multiplexer 122 is a signal resulting from time-division-multiplexing of a plurality of ACK signals or NACK signals.

In the case of FIG. 3, a plurality of ACK signals or NACK signals are transmitted but as the ACK signals or NACK signals are one bit whereas the five bits are required for CQIs, the overall quantity of signal can be reduced.

According to Embodiment 5, a sub-carrier of good reception quality is selected, and an ACK signal or NACK signal is allocated to the selected sub-carrier. By reducing the amount of signal transmitted on the uplink, it is possible to increase the data capacity that can be transmitted and reduce power consumption, and, by reducing interference with respect to other wireless communication apparatuses, it is possible to increase system capacity.

According to Embodiment 5, dual purpose use of the ACK signal or NACK signal indicative of whether or not re-transmission is required and reception quality information which is CQIs is possible, and the CQIs and SC number information are not transmitted. The amount of signals transmitted through the uplink is therefore reduced to an extreme level.

Further, according to Embodiment 5, designation while selecting sub-carriers for which CQIs are generated may be achieved simply by transmitting designation information designating the number of CQIs from the base station apparatus. It is therefore possible to reduce the amount of signal transmitted through the uplink without increasing the amount of signal transmitted through the downlink.

In Embodiment 5, wireless communication apparatus 1400 spreads sub-carriers by selecting user-specific spreading codes and spreading sub-carriers allocated with ACK signals or NACK signals. However, this is by no means limiting, and it is also possible to perform scrambling by selecting user-specific scrambling codes and allocating ACK signals or NACK signals using the selected scrambling codes.

In Embodiments 1 to 5, 64 sub-carriers are allocated within communication band F1 but this is by no means limiting and it is also possible to allocate an arbitrary number of sub-carriers other than 64.

The wireless communication apparatus of Embodiments 1 to 5 may also be applied to a communication terminal apparatus.

In Embodiments 3 to 5, sub-carriers to be selected are determined using a threshold determination for reception quality for each sub-carrier, but it is also possible to select just the number of sub-carriers notified by an upper order station as in Embodiment 1.

Each functional block employed in the description of each of the aforementioned embodiments may be typically implemented as an LSI which is an integrated circuit.

These may be integrated into chips individually, or may be integrated into chips in such a manner that each includes part or all of them.

An LSI is adopted here but this may also be referred to as "IC", "system LSI", "super LSI", or "ultra LSI" depending on a difference in degree of integration.

Further, a method of circuit integration is not limited to LSI's, and implementation using dedicated circuitry or general purpose processors is also possible.

After LSI manufacturing, utilization of a programmable FPGA (Field Programmable Gate Array) or a reconfigurable processor where connections and settings of circuit cells within an LSI can be reconfigured is also possible.

Further, if circuit integration technology comes out to replace LSI's as a result of the advancement of semiconductor technology or another derivative technology, it is, of course, possible to carry out functional block integration using such technology.

Application in biotechnology is also possible.

As described above, according to the present invention, by reducing the amount of signal transmitted, it is possible to increase the data capacity that can be transmitted and reduce power consumption and, by reducing interference with respect to other wireless communication apparatuses, it is possible to increase system capacity.

This specification is based on Japanese patent application No. 2003-288162, filed on Aug. 6, 2003, the entire content of which is expressly incorporated by reference herein.

INDUSTRIAL APPLICABILITY

The wireless communication apparatus and reception quality reporting method of the present invention are capable of increasing data capacity that can be transmitted and reducing power consumption by reducing the amount of control signal transmitted, have an advantage of increasing system capacity by reducing interference with respect to other wireless communication apparatuses, and suitable for use in giving reporting of reception quality for wireless communication apparatus.

FIG. 1
102 RECEPTION WIRELESS PROCESSING SECTION
103 GI REMOVING SECTIONS
104 FFT SECTION
105 CONTROL INFORMATION EXTRACTION SECTION
106 DEMODULATING SECTION
107 DECODING SECTION
126 TRANSMISSION WIRELESS PROCESSING SECTION
108 USER DATA EXTRACTION SECTION
109 DEMODULATING SECTION
110 RECEPTION HARQ SECTION
111 DECODING SECTION
125 GI INSERTION SECTION
112 PILOT SIGNAL EXTRACTION SECTION
113-1~113-N RECEPTION QUALITY MEASURING SECTIONS
127 SC SELECTING SECTION

124 IFFT SECTION
123 S/P CONVERTER
122 MULTIPLEXER
116 MODULATING SECTION
115 ENCODING SECTION
114 CQI GENERATING SECTION
118 MODULATING SECTION
117 ENCODING SECTION
121 MODULATING SECTION
120 ENCODING SECTION
119 ACK/NACK GENERATING SECTION
CONTROL INFORMATION
USER DATA
FIG. 2
202 RECEPTION WIRELESS PROCESSING SECTION
203 GI REMOVAL SECTION
204 FFT SECTION
205 CONTROL INFORMATION EXTRACTION SECTION 205
206 DEMODULATING SECTION
207 DECODING SECTION
208 CONTROL SECTION
209 ENCODING SECTION
210 TRANSMITTED SIGNAL HARQ SECTION
211 MODULATING SECTION
212 ENCODING SECTION
213 MODULATING SECTION
214 MULTIPLEXER
215 SUB-CARRIER ALLOCATION SECTION
216 S/P CONVERTER
217 IFFT SECTION
218 GI INSERTION SECTION
219 TRANSMISSION WIRELESS PROCESSING SECTION
220 CONTROL DATA TRANSMISSION PROCESSING SECTION
CQI QUANTITY INFORMATION
CONTROL DATA
TRANSMISSION DATA
FIG. 3
FREQUENCY
FIG. 4
6 BITS, 5 BITS, 1 BIT
SC NUMBER INFORMATION 11, CQI FOR SC NUMBER INFORMATION 11 ...
CONTROL INFORMATION
FIG. 5
1 BIT, 11 BITS ...
CQI FOR SC NUMBER 11, ...
BIT 1, BIT 10, BIT 21 ...
CONTROL INFORMATION
FIG. 6 (FIG. 1)
601 THRESHOLD VALUE DETERMINING CIRCUIT
FIG. 7 (FIG. 1)
701 THRESHOLD VALUE DETERMINING SECTION
702 USED SUB-CARRIER SELECTING SECTION
703 SPREADING SECTION
FIG. 8 (FIG. 2)
801 DE-SPREADING SECTION
802 SUB-CARRIER DETERMINING SECTION
FIG. 9
5 BITS, 1 BIT
CQI FOR SC(b)
ACK/NACK SIGNAL
CONTROL INFORMATION
FIG. 10 (FIG. 1)
FIG. 11 (FIG. 2)
FIG. 12 (FIG. 4)
FIG. 13
64 BITS, 1 BIT
1 BIT, 2 BITS, ...
CONTROL INFORMATION
FIG. 14 (FIG. 1)
1401 THRESHOLD VALUE DETERMINING SECTION
1402 CQI SPREADING CODE GENERATING SECTION
1403 USED SUB-CARRIER SELECTING SECTION
1404 SPREADING SECTION
FIG. 15 (FIG. 2)
1501 DE-SPREADING SECTION
1502 DETERMINING SECTION

What is claimed is:

1. A base station comprising:
a multiplexer configured to multiplex (1) control information comprising first information indicating a fixed number identifying quantity of sub-carrier bands to be selected by a mobile station for channel quality reporting; and (2) data information;
a radio transmitter coupled to the multiplexer and configured to transmit the multiplexed information to the mobile station;
a radio receiver configured to receive second information and third information from the mobile station; and
a controller coupled to the radio receiver and configured to obtain, from the second information, channel quality of selected sub-carrier bands and to obtain, from the third information, positions of the selected sub-carrier bands, wherein the selected subcarrier bands are selected by the mobile station and quantity of the selected sub-carrier bands matches the quantity of sub-carrier bands indicated by the first information.

2. The base station according to claim 1, wherein the selected sub-carrier bands are selected, by the mobile station, in descending order of measured channel quality.

3. The base station according to claim 1, wherein the controller is configured to determine one or more sub-carrier bands to be used by the mobile station based on the second information and the third information.

4. The base station according to claim 3, wherein the controller determines the one or more sub-carrier bands, which the second information and the third information indicate as satisfying determined criteria, for use by the mobile station.

5. The base station according to claim 3, wherein the controller determines the one or more sub-carrier bands to be used by the mobile station based on the second information and the third information, and further based on one or more sub-carrier bands determined to be used by another mobile station.

6. The base station according to claim 3, wherein the controller further determines a modulation and coding scheme for each of the determined one or more sub-carrier bands to be used by the mobile station.

7. The base station according to claim 3, wherein the controller further determines an encoding rate for each of the determined one or more sub-carrier bands to be used by the mobile station.

8. The base station according to claim 3, wherein the controller further allocates transmission data to be sent to the mobile station to each of the determined one or more sub-carrier bands.

9. The base station according to claim 1, wherein the second information is spread by the mobile station using a spreading code specific to each user, and the base station further comprises a despreader coupled to the radio receiver and configured to despread the spread information.

10. The base station according to claim 1, wherein the third information is spread by the mobile station using a spreading code specific to each user, and the base station further comprises a despreader coupled to the radio receiver and configured to despread the spread information.

11. A communication method implemented by a base station, the method comprising:
multiplexing (1) control information comprising first information indicating a fixed number identifying quantity of sub-carrier bands to be selected by a mobile station for channel quality reporting and (2) transmission data;
transmitting the multiplexed information to the mobile station;
receiving second information and third information from the mobile station; and
obtaining, from the second information, channel quality of selected sub-carrier bands and obtaining, from the third information, positions of the selected sub-carrier bands, wherein the selected sub-carrier bands are selected by the mobile station and quantity of the selected sub-carrier bands matches the quantity of sub-carrier bands indicated by the first information.

12. The communication method according to claim 11, wherein the selected sub-carrier bands are selected, by the mobile station, in descending order of measured channel quality.

13. The communication method according to claim 11, further comprising determining one or more sub-carrier bands to be used by the mobile station based on the second information and the third information.

14. The communication method according to claim 13, wherein the one or more sub-carrier bands, which the second information and the third information indicate as satisfying determined criteria, are determined to be used by the mobile station.

15. The communication method according to claim 13, wherein the one or more sub-carrier bands to be used by the mobile station are determined based on the second information and the third information, and further based on one or more sub-carrier bands determined to be used by another mobile station.

16. The communication method according to claim 13, further comprising determining a modulation and coding scheme for each of the determined one or more sub-carrier bands to be used by the mobile station.

17. The communication method according to claim 13, further comprising determining an encoding rate for each of the determined one or more sub-carrier bands to be used by the mobile station.

18. The communication method according to claim 13, further comprising allocating transmission data to be sent to the mobile station to each of the determined one or more sub-carrier bands.

19. The communication method according to claim 11, wherein the second information is spread by the mobile station using a spreading code specific to each user, and the method further comprises despreading the spread information.

20. The communication method according to claim 11, wherein the third information is spread by the mobile station using a spreading code specific to each user, and the method further comprises despreading the spread information.

21. A wireless communication apparatus comprising:
a radio receiver configured to acquire, from a base station, multiplexed information comprising (1) control information comprising first information indicating a fixed number identifying quantity of sub-carrier bands to be selected by a mobile station for channel quality reporting; and (2) data information;
a demultiplexer configured to demultiplex the multiplexed information and to provide demultiplexed control information and data information;
a reception quality measurer coupled to the radio receiver and configured to measure channel quality of each of a plurality of sub-carrier bands within a communication band from received signals;
a subcarrier selector coupled to the radio receiver and configured to select subcarrier bands from the plurality of sub-carrier bands, wherein quantity of the selected subcarrier bands matches the quantity of sub-carrier bands identified by the fixed number obtained from the demultiplexed control information;
a modulator configured to modulate a second information indicating channel quality of the selected sub-carrier bands according to a modulation scheme and a third information indicating positions of the selected subcarrier bands according to the modulation scheme; and
a radio transmitter configured to report to the base station the second and third modulated information.

22. The wireless communication apparatus according to claim 21, wherein the subcarrier selector is configured to select the indicated fixed number of sub-carrier bands in descending order of measured channel quality.

23. The wireless communication apparatus according to claim 21, wherein the radio transmitter is further configured to spread the second information indicating channel quality of the selected sub-carrier bands using a spreading code specific to each user, and report the spread second information.

24. The wireless communication apparatus according to claim 21, wherein the radio transmitter is further configured to spread the third information indicating positions of the selected sub-carrier hands using a spreading code specific to each user, and report the spread information.

* * * * *

UNITED STATES PATENT AND TRADEMARK OFFICE
CERTIFICATE OF CORRECTION

PATENT NO.         : 10,122,491 B2
APPLICATION NO.    : 15/613794
DATED              : November 6, 2018
INVENTOR(S)        : Nishio et al.

Page 1 of 1

It is certified that error appears in the above-identified patent and that said Letters Patent is hereby corrected as shown below:

In the Claims

Claim 24, Column 24, Line 53, change "sub-carrier hands" to --sub-carrier bands--

Signed and Sealed this
Twelfth Day of March, 2019

Andrei Iancu
*Director of the United States Patent and Trademark Office*